US00RE38086E

(19) United States
(12) Reissued Patent
Onishi et al.

(10) Patent Number: US RE38,086 E
(45) Date of Reissued Patent: Apr. 22, 2003

(54) DISPERSION COMPENSATING FIBER AND OPTICAL TRANSMISSION SYSTEM INCLUDING THE SAME

(75) Inventors: Masashi Onishi, Yokohama (JP); Hiroo Kanamori, Yokohama (JP); Masayuki Nishimura, Yokohama (JP); Tomonori Kashiwada, Yokohama (JP); Yasushi Koyano, Yokohama (JP)

(73) Assignee: Sumitomo Electric Industries, Ltd., Osaka (JP)

(21) Appl. No.: 09/714,615

(22) Filed: Nov. 17, 2000

Related U.S. Patent Documents

Reissue of:
(64) Patent No.: 5,838,867
Issued: Nov. 17, 1998
Appl. No.: 08/834,305
Filed: Apr. 15, 1997

(30) Foreign Application Priority Data

Apr. 15, 1996 (JP) ..... 8-092692

(51) Int. Cl.[7] ..... G02B 6/16
(52) U.S. Cl. ..... 385/123; 385/126; 385/127
(58) Field of Search ..... 385/123, 124, 385/125, 126, 127, 128

(56) References Cited

U.S. PATENT DOCUMENTS

| | | | | |
|---|---|---|---|---|
| 4,755,022 | A | 7/1988 | Ohashi et al. | 385/127 |
| 5,361,319 | A | 11/1994 | Antos et al. | 385/123 |
| 5,596,448 | A | 1/1997 | Onaka et al. | 359/341 |

FOREIGN PATENT DOCUMENTS

JP 6-11620 1/1994

OTHER PUBLICATIONS

Kubo et al., "Dispersion Flattened Single–Mode Fiber for 10,000km Transmission System", 16th European Conference on Optical Communication, Sep. 1990, vol. 1.

Bachmann et al., "Dispersion–Flattened Single–Mode Fibers Prepared with PCVD: Performance, Limitations, Design Optimization", Journal of Lightwave Technology, vol. LT–4, No. 7, Jul. 1986, pp. 858–863.

Kubo et al., "Characteristics of Low Dispersion SM Fiber with Double Cladding", p. 4–429.

*Primary Examiner*—Phan T. H. Palmer
(74) *Attorney, Agent, or Firm*—McDermott, Will & Emery

(57) ABSTRACT

The present invention relates to a dispersion compensating fiber for improving a transmission system with it in total chromatic dispersion and dispersion slope in the 1.55 $\mu$m wavelength band. The dispersion compensating fiber according to the present invention is characterized by having the following characteristics for light in the 1.55 $\mu$m wavelength band: chromatic dispersion not less than −40 ps/km/nm and not more than 0 ps/km/nm; dispersion slope not less than −0.5 ps/km/nm$^2$ and not more than −0.1 ps/km/nm$^2$; transmission loss not more than 0.5 dB/km; polarization mode dispersion not more than 0.7 ps.km$^{-1/2}$; mode field diameter not less than 4.5 $\mu$m and not more than 6.5 $\mu$m; cut-off wavelength not less than 0.7 $\mu$m and not more than 1.7 $\mu$m in the length of 2 m; and bending loss at the diameter of 20 mm, not more than 100 dB/m. The dispersion compensating fiber is optically connected with a dispersion shifted fiber as a compensated object at a ratio of appropriate lengths, which can improve the system including the dispersion compensating fiber in the total chromatic dispersion and dispersion slope of the system in the 1.55 $\mu$m band.

51 Claims, 10 Drawing Sheets

*Fig. 10*

| | No.1 | No.2 | No.3 | No.4 | No.5 | No.6 | No.7 | No.8 | No.9 | No.10 | No.11 |
|---|---|---|---|---|---|---|---|---|---|---|---|
| $\Delta^+$ (%) | 1.0 | 1.0 | 0.9 | 0.8 | 1.2 | 1.2 | 1.4 | 1.0 | 1.0 | 1.0 | 0.6 |
| $\Delta^-$ (%) | 0.50 | 0.40 | 0.40 | 0.40 | 0.50 | 0.40 | 0.50 | 0.50 | 0.50 | 0.40 | 0.40 |
| 2a (μm) | 4.66 | 4.55 | 4.80 | 5.20 | 4.10 | 4.00 | 3.70 | 5.50 | 6.50 | 4.40 | 5.80 |
| Ra | 0.35 | 0.33 | 0.33 | 0.33 | 0.35 | 0.33 | 0.35 | 0.50 | 0.35 | 0.33 | 0.35 |
| Disp@1550(ps/km/nm) | -18 | -20 | -12 | -4 | -35 | -39 | -60 | 2 | 5 | -28 | -2 |
| Slope@1550 (ps/km/nm$^2$) | -0.30 | -0.28 | -0.19 | -0.12 | -0.15 | -0.14 | -0.20 | -0.02 | 0.06 | -0.40 | -0.20 |
| Total Slope@1550 (ps/km/nm$^2$) | 0.01 | 0.02 | 0.02 | -0.02 | 0.05 | 0.05 | 0.06 | Compensation impossible | | 0.02 | -0.24 |
| Loss@1550(dB/km) | 0.27 | 0.25 | 0.24 | 0.22 | 0.29 | 0.29 | 0.33 | 0.27 | 0.26 | 0.33 | 0.22 |
| PMD(ps/$\sqrt{km}$) | 0.08 | 0.11 | 0.09 | 0.10 | 0.11 | 0.09 | 0.12 | 0.10 | 0.11 | 0.10 | 0.06 |
| MFD(μm) | 5.5 | 5.6 | 5.6 | 5.9 | 5.1 | 5.1 | 5 | 5.9 | 6 | 5.7 | 6.1 |
| Cut-off(μm) | 0.79 | 0.78 | 0.81 | 0.8 | 0.77 | 0.76 | 0.78 | 0.89 | 0.9 | 0.77 | 0.78 |
| Bend Loss(dB/m) | 11 | 15 | 13 | 25 | 9 | 11 | 2 | 0.8 | 0.5 | 18 | 13 |

*Fig. 11*

| | No.12 | No.13 | No.14 |
|---|---|---|---|
| $\Delta^+$ (%) | 1.0 | 1.0 | 1.0 |
| $\Delta^-$ (%) | 0.5 | 0.5 | 0.5 |
| $\Delta_r$ (%) | 0.2 | 0.2 | 0.3 |
| 2a (μm) | 4.5 | 4.6 | 4.9 |
| Ra | 0.35 | 0.35 | 0.35 |
| Disp@1550(ps/km/nm) | -30 | -18 | -5 |
| Slope@1550 (ps/km/nm$^2$) | -0.39 | -0.19 | -0.06 |
| Total Slope@1550 (ps/km/nm$^2$) | +0.03 | +0.03 | +0.03 |
| Loss@1550(dB/km) | 0.28 | 0.28 | 0.29 |
| PMD(ps/$\sqrt{km}$) | 0.08 | 0.07 | 0.07 |
| MFD(μm) | 5.3 | 5.3 | 5.3 |
| Cut-off(μm) | 0.8 | 0.82 | 0.83 |
| Bend Loss(dB/m) | 10 | 4 | 0.5 |

DISPERSION COMPENSATING FIBER AND OPTICAL TRANSMISSION SYSTEM INCLUDING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a dispersion compensating fiber and an optical transmission system including the same, which are applied to an optical fiber transmission network capable of long-distance and high-bit-rate optical communication utilizing the 1.55 μm-band wavelength-multiplexing signal light.

2. Related Background Art

From social needs based on the coming of advanced information society, research and development has been conducted vividly heretofore as to high-bit-rate high-speed communication such as video communication and long-distance communication such as international communication utilizing the optical fiber transmission network.

In the case of the optical fiber transmission network to realize such long-distance and high-bit-rate optical communication, first, its transmission lines need to be optical fibers that permit only single-mode propagation. It is because mode dispersion (represented by dispersion due to a difference between group velocities of respective propagation modes) inevitably takes place in the case of multimode communication.

Thus, the first countermeasure was the single-mode optical fiber permitting only single-mode propagation. This single-mode optical fiber is free of occurrence of mode dispersion, but chromatic dispersion represented by the sum of material dispersion (dispersion due to wavelength dependence of refractive index specific to a material of optical fiber) and structural dispersion (dispersion due to wavelength dependence of group velocity of propagation mode) confines transmission capacity. Specifically, even if the wavelength of light emitted from a light source is said to be single, though rigorously speaking, it will have a certain spectral width. When a light pulse having this spectral width propagates in the single-mode optical fiber having predetermined chromatic dispersion characteristics, the width of the light pulse if broadened, so as to deform the pulse shape. This chromatic dispersion is expressed as a transmission delay time difference per unit spectral width (nm) and unit optical fiber length (km) in units of ps/km/nm).

It is, however, known that silica normally used as a material for optical fiber shows zero material dispersion near the wavelengths of 1.26 to 1.29 μm. Since the structural dispersion varies depending upon parameters of optical fiber, the optimum design of the parameters of optical fiber permits the material dispersion and the structural dispersion to cancel each other near the wavelengths of 1.3 to 1.32 μm, thereby realizing zero chromatic dispersion. Therefore, use of single-mode optical fiber allows longer-distance and larger-bit-rate optical communication near the wavelength 1.3 μm than use of multimode optical fiber does. In practice, the single-mode optical fibers are used in optical communication of the communication distance of several hundred km and the communication capacity of several hundred Mbit/sec.

However, transmission loss of optical fiber is minimum in the 1.55 μm wavelength band, from which there have been desires for optical communication utilizing the 1.55 μm-band light. This resulted in developing a dispersion shifted fiber in which the wavelength where the chromatic dispersion was zero (zero-dispersion wavelength) was shifted into this wavelength band. In the dispersion shifted fiber, because the material dispersion cannot be changed so much, the index profile thereof is designed optimally to change the value of structural dispersion, thereby setting the zero-dispersion wavelength in the vicinity of 1.55 μm. This dispersion shifted fiber, together with an erbium (Er)-doped optical fiber amplifier, is employed in the long distance optical fiber transmission system with the transmission capacity being several Gbit/sec, utilizing the 1.55 μm-band wavelength division multiplexing (WDM) signal light.

On the other hand, there are many single-mode optical fibers already installed heretofore. Therefore, needs exist for optical communication in the 1.55 μm wavelength band utilizing the existing single-mode optical fiber transmission network. Thus, an attempt has been made to cascade-connect connect a dispersion compensating fiber having negative chromatic dispersion and negative dispersion slope to a single-mode optical fiber having positive chromatic dispersion in the 1.55 μm wavelength band, thereby canceling out the chromatic dispersion and dispersion slope as the whole of optical transmission line (for example, as in the bulletin of Japanese Laid-open Patent Application No. 6-11620).

In a graph to show the chromatic dispersion, the dispersion slope is given as a slope of the graph.

SUMMARY OF THE INVENTION

The inventors investigated the above-stated prior art and found the following problems. Specifically, with the above-stated dispersion shifted fiber, the chromatic dispersion thereof becomes zero at a predetermined wavelength near the wavelength 1.55 μm. However, the chromatic dispersion is not zero in the regions before and after the wavelength (the zero-dispersion wavelength) and the chromatic dispersion increases with increasing wavelength in general when a sign of chromatic dispersion is positive. In other words, the dispersion slope (which is the wavelength dependence of chromatic dispersion and is expressed in units of (ps/km/nm$^2$)) has a positive sign in this condition. This would be a problem in the case of communication by the wavelength division multiplexing (WDM) system for multiplexing signal light components of mutually different wavelengths in order to further raise the transmission speed to higher rates. Namely, there is such a tendency that among the 1.55 μm-band wavelength-multiplexing signal light (having a plurality of wavelengths) the chromatic dispersion becomes larger (positive) for signal light components of longer wavelengths while the chromatic dispersion becomes smaller (negative) for signal light components of shorter wavelengths (i.e., there is such a trend as to have positive dispersion slope), which results in the limit of increase in transmission speed in the WDM method.

On the other hand, studies on dispersion-flattened optical fibers the both chromatic dispersion and dispersion slope of which become nearly zero in the 1.55 μm wavelength band are reported, for example, in Kubo et al., "Characteristics of double cladding type low-dispersion SM fiber," C-374, Abstracts (The spring meeting, 1990); Institute of Electronics, Information and Communication Engineers of Japan, and P. K. Bachmann et al., "Dispersion-Flattened Single-Mode Fibers Prepared with PCVD: Performance, Limitations, Design Optimization, " J. of Lightwave Technol., Vol. LT-4, No. 2, pp. 858–863 (1986). However, the dispersion=flattened fibers need to be fabricated with extremely precise control of the size, such as the core diameter, and the refractive index profile and are hard to fabricate, thus not coming to the stage of practical application yet.

A dispersion compensating optical fiber according to the present invention is optically connected to the conventional optical fiber (an optical transmission line being a compensated object), so as to compose an optical transmission system. It is, therefore, an object of the present invention to provide a dispersion compensating fiber enabling the long-distance and high-bit-rate optical communication by optically connecting the dispersion compensating fiber according to the present invention to the conventional optical fiber transmission line in respectively appropriate lengths, thereby improving the overall chromatic dispersion and dispersion slope of the optical transmission line in the 1.55 μm wavelength band (i.e., making absolute values of chromatic dispersion and dispersion slope closer to zero), and to provide an optical transmission system comprising it.

The dispersion compensating fiber according to the present invention is used for compensated objects mainly including dispersion shifted fibers the zero-dispersion wavelength of which is set in the range of 1450 to 1650 nm and optical fiber transmission lines including such dispersion shifted fibers. Further, the dispersion compensating fiber according to the present invention is preferably used for compensated objects including dispersion shifted fibers the zero-dispersion wavelength of which is set in the range of 1450 to 1550 nm and optical fiber transmission lines including such dispersion shifted fibers. Either one of these dispersion-compensated objects has positive dispersion slope.

Accordingly, the dispersion compensating fiber according to the present invention is characterized by having the following characteristics for 1.55 μm-band light: chromatic dispersion not less than −40 ps/km/nm and not more than 0 ps/km/nm; dispersion slope not less than −0.5 ps/km/nm$^2$ and not more than −0.1 ps/km/nm$^2$; transmission loss not more than 0.5 dB/km; polarization mode dispersion not more than 0.7 ps.km$^{-1/2}$; mode field diameter not less than 4.5 μm and not more than 6.5 μm; cut-off wavelength not less than 0.7 μm and not more than 1.7 μm at the length of 2 m or the like; and bending loss at the diameter of 20 mm, not more than 100 dB/m.

In this specification, "1.55 μm wavelength band" means the band is in the range of wavelengths 1500 to 1600 nm.

The transmission line can be improved in the overall chromatic dispersion and dispersion slope in the 1.55 μm band by optically connecting the dispersion compensating fiber with an optical fiber as a compensated object (mainly, a dispersion shifted fiber of a transmission system including this dispersion shifted fiber) at a predetermined ratio of lengths. Further, long-distance and high-bit-rate optical communication becomes possible based on these characteristics and the conditions of transmission loss, polarization mode dispersion, mode field diameter, cut-off wavelength (cut-off wavelength in the reference length of 2 m), and bending loss (bending loss at the diameter of 20 mm).

Further, the dispersion compensating fiber according to the present invention preferably has such characteristics for the 1.55 μm band light that the chromatic dispersion thereof is not less than −20 ps/km/nm and not more than −5 ps/km/nm and that the dispersion slope thereof is not less than −0.4 ps/km/nm$^2$ and not more than −0.13 ps/km/nm$^2$. This setting of chromatic dispersion and dispersion slope allows the whole of the optical transmission system including the dispersion compensating fiber (and including the dispersion shifted fiber the zero-dispersion wavelength of which is set in the wavelength range of 1450 to 1650 nm, preferably in the range of 1450 to 1550 nm) to be compensated more suitably (which means that the absolute values of chromatic dispersion and dispersion slope of the whole can be made closer to zero).

For achieving the above characteristics, the dispersion compensating fiber according to the present invention is characterized by being a single-mode optical fiber mainly containing a silica-based glass, which comprises at least: a core region having a predetermined refractive index, said core region having an outer diameter not less than 3.5 μm and not more than 6.0 μm; an inside cladding region provided on the periphery of the core region and having a lower refractive index than the core region, wherein a ratio of the outer diameter of the core region to an outer diameter of this inside cladding region is not less than 0.3 and not more than 0.5; and an outside cladding region provided on the periphery of the inside cladding region and having a higher refractive index than the inside cladding region and a lower refractive index than the core region, wherein a relative refractive index difference between the outside cladding region and a portion with a maximum refractive index in said core region is not less than 0.6% and not more than 1.4% and wherein a relative refractive index difference between the outside cladding region and a portion with a minimum refractive index in the inside cladding region is not less than 0.25% and not more than 0.65%.

Further, when the dispersion compensating fiber is of triple cladding structure, the dispersion compensating fiber has an intermediate cladding region having a higher refractive index than the outside cladding region and a lower refractive index than the core region, between the above inside cladding region and outside cladding region. A refractive index difference between the outside cladding region and a portion with a maximum refractive index in the intermediate cladding region is not less than 0.2% and not more than 0.5%.

In order to attain the sufficient relative refractive index difference with a low dopant concentration, the dispersion compensating fiber according to the present invention, having the above configuration, is preferably made in such a manner that the above core region is doped with the germanium element and the above inside cladding region is doped with the fluorine element. In addition, it is also possible to realize such a configuration that the above outside cladding region is also doped with the fluorine element.

Further, the dispersion compensating fiber according to the present invention, together with another optical fiber (compensated object) optically connected to the dispersion compensating fiber and forming a part of the optical transmission line, constitutes an optical transmission system (see FIG. 1). The optical transmission system including the dispersion compensating fiber preferably has the dispersion slope not less than −0.02 ps/km/nm$^2$ and not more than 0.05 ps/km/nm$^2$ for the 1.5 μm-band light. Such an optical transmission system permits long-distance and high-bit-rate optical transmission and particularly, in realizing the optical communication utilizing multi-wavelength light by the WDM method, it permits much longer-distance and higher-bit-rate optical communication.

The optical fiber transmission line as a dispersion-compensated object, forming the optical transmission line of the optical transmission system together with the dispersion compensating fiber, is preferably a dispersion shifted fiber the zero-dispersion wavelength of which is shifted to 1560 nm or less. When the compensated object is the dispersion shifted fiber having the zero-dispersion wavelength not more than 1.56 $\mu$m, the dispersion shifted fiber is readily compensated for the chromatic dispersion and chromatic dispersion slope by the dispersion compensating fiber according to the present invention.

In addition, the optical transmission system comprising the dispersion compensating fiber and the dispersion shifted fiber as a compensated object as described above may further comprise an optical fiber amplifier forming a part of the optical transmission line. This optical fiber amplifier comprises at least an optical fiber for amplification a core region of which is doped with the erbium element, an excitation light source for outputting exciting light for exciting the erbium element in the optical fiber, to the optical fiber, and an optical coupler for optically coupling the excitation light source with the optical fiber. Since the length of the optical fiber for amplification inserted in this optical transmission system is far shorter than the length of the dispersion shifted fiber or the whole optical transmission line including the dispersion shifted fiber, contribution thereof to the chromatic dispersion and dispersion slope to be compensated for as the whole of optical transmission line is negligible.

On the other hand, the dispersion compensating fiber according to the present invention may be made in such a configuration that the core region is doped with the erbium element. The dispersion compensating fiber containing the erbium element as described can function as an optical fiber for amplification.

Accordingly, the optical transmission system comprising the dispersion compensating fiber the core region of which is doped with the erbium element comprises the dispersion compensating fiber according to the present invention, another optical fiber (compensated object) optically connected to the dispersion compensating fiber and forming a part of the optical transmission line, an excitation light source for outputting exciting light for exciting the erbium element in the dispersion compensating fiber, to the dispersion compensating fiber, and an optical coupler for optically coupling the excitation light source with the dispersion compensating fiber. According to this configuration, the optical transmission system comprising the dispersion compensating fiber, as the whole of optical transmission line, has the dispersion slope not less than −0.02 ps/km/nm$^2$ and not more than 0.05 ps/km/nm$^2$ for the 1.5 $\mu$m-band light. The optical transmission system of this type enables longer-distance, higher-bit-rate, and low-loss optical communication.

In the optical transmission system comprising this optical fiber amplifier (having the dispersion compensating fiber according to the present invention), the above dispersion-compensated object is preferably a dispersion shifted fiber the zero-dispersion wavelength of which is shifted to 1560 nm or less.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

*FIGS. 4 and 4A are drawings* to show the cross-sectional structure and index profile of the first embodiment of the dispersion compensating fiber according to the present invention;

*FIGS. 5 and 5A are drawings* to show the cross-sectional structure and index profile of the second embodiment of the dispersion compensating fiber according to the present invention;

*FIGS. 6 and 6A are drawings* to show the cross-sectional structure and index profile of the third embodiment of the dispersion compensating fiber according to the present invention;

FIG. 10 is a table to show experiment results of dispersion compensating fibers having the double cladding structure; and FIG. 11 is a table to show experiment results of dispersion compensating fibers having the triple cladding structure.

DETAILED DESCRIPTION OF THE PREFERRED EMBODIMENTS

Figure 1:
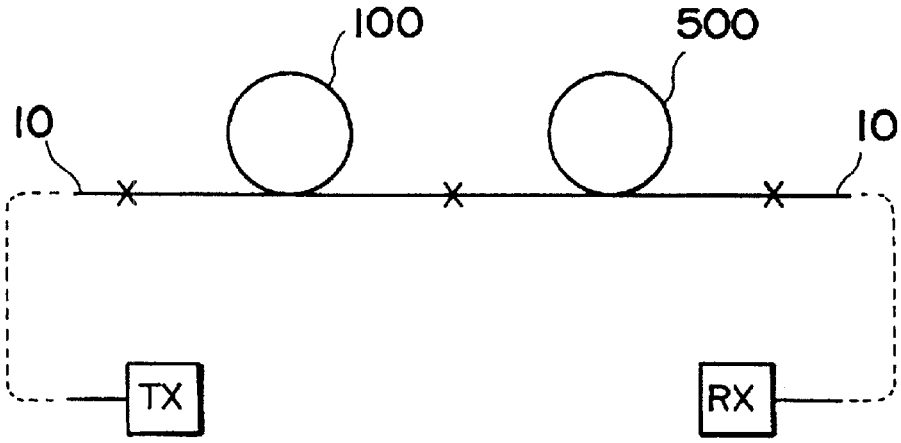
FIG. 1 is a drawing to show the configuration of the optical transmission system having the dispersion compensating fiber according to the present invention and the dispersion shifted fiber.

The dispersion compensating fiber and the optical transmission system including it according to the present invention will be described with reference to FIG. 1 to FIG. 10. In the description of the drawings the same elements will be denoted by the same reference numerals and redundant description will be omitted.

The dispersion compensating fiber according to the present invention has the following characteristics in the 1.55 $\mu$m wavelength band. Specifically, the chromatic dispersion is in the range of −40 to 0 ps/km/nm, the dispersion slope is in the range of −0.5 to −0.1 ps/km/nm$^2$, the transmission loss is not more than 0.5 dB/km, the polarization mode dispersion (PMD) is not more than 0.7 ps.km$^{-1/2}$, the mode field diameter (MFD) is in the range of 4.5 to 6.5 μm, the cut-off wavelength is in the range of 0.7 to 1.7 μm, and the bending loss at the diameter of 20 mm is not more than 100 dB/m.

In the case of optical transmission in the 1.55 μm band, the cut-off wavelength normally selected is one not more than 1.55 μm, which is shorter than the wavelength of signal light in the reference length of 2 m (according to the measuring method by CCITT-G.650). In the length as short as 2 m being the reference of normal evaluation of cut-off wavelength, not only the fundamental mode of transmitted light but also higher modes may propagate in the case of the dispersion shifted fiber (for example, in the case of the cut-off wavelength being 1.7 μm in the reference length of 2 m). However, the higher modes have higher attenuation rates in propagation in the dispersion shifted fiber than the fundamental mode, so that they are attenuated sufficiently in the propagation length of several km, as compared with the fundamental mode. Therefore, when the propagation distance ranges from several hundred to several thousand km like submarine communication cables, the higher modes will raise no problem. The above bending loss is an increase in transmission loss of the dispersion compensating fiber, when measured in such a state that it is wound around a mandrel having the diameter of 20 mm. In this specification, the 1.55 μm wavelength band is the band ranging from 1500 to 1600 nm.

The dispersion compensating fiber according to the present invention compensates not only for the chromatic dispersion, but also for the dispersion slope of another optical fiber being a compensated object (for example, the single-mode optical fiber, the dispersion shifted fiber, or the whole of the optical fiber transmission line including these fibers) as described hereinafter. Particularly, it is suitable for compensating for the chromatic dispersion and dispersion slope of the dispersion shifted fiber. It is more preferable in compensating for the chromatic dispersion and dispersion slope of the dispersion shifted fiber that the chromatic dispersion be in the range of −20 to −5 ps/km/nm and the dispersion slope be in the range of −0.4 to −0.13 ps/km/nm$^2$.

Next, the configurations of the optical transmission system having the dispersion compensating fiber according to the present invention will be described referring to FIG. 1 and FIG. 2.

FIG. 1 is a drawing to show the configuration of the optical transmission system in which the dispersion compensating fiber 100 according to the present invention is cascade-connected with the dispersion shifted fiber 500 being a main compensated object. In this optical transmission system, one end (input end) of the dispersion compensating fiber 100 is optically connected through optical fiber transmission line 10 (single-mode optical fiber) with a transmitter TX and the other end (output end) thereof is optically connected with one end (input end) of dispersion shifted fiber 500. Further, the other end (output end) of the dispersion shifted fiber 500 is optically connected through optical fiber transmission line 10 (single-mode optical fiber) with a receiver RX. In FIG. 1, the dispersion compensating fiber 100 is located upstream of the dispersion shifted fiber 500, but it may be placed downstream of the dispersion shifted fiber 500. The optical transmission line of the optical transmission system shown in FIG. 1 may be a two-way-communicable optical transmission network.

Figure 2:
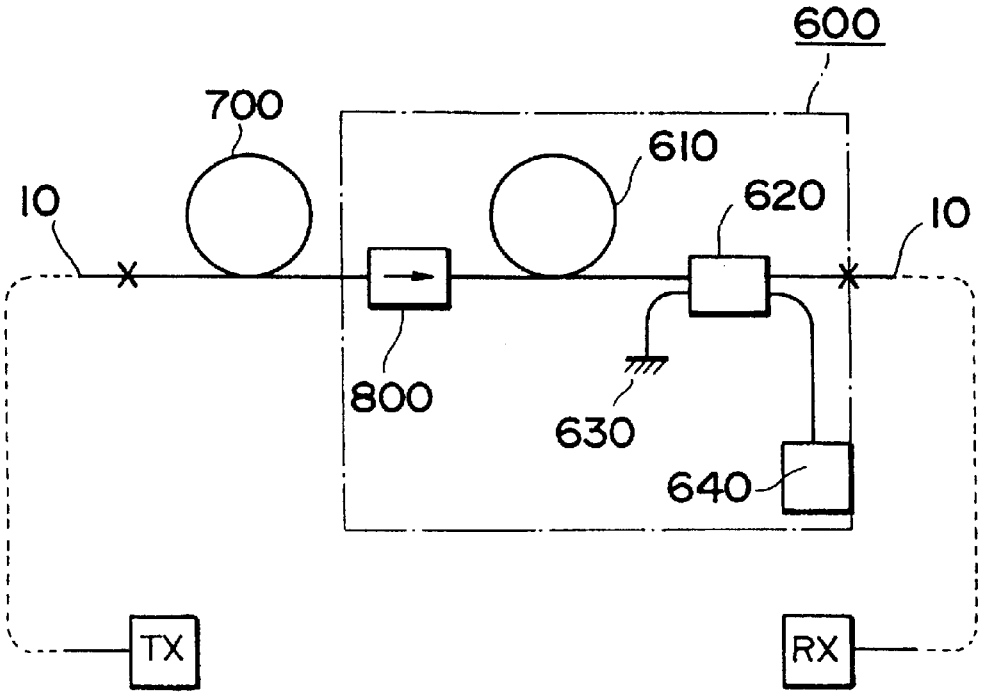
FIG. 2 is a drawing to show the configuration of the optical transmission system comprising the dispersion compensating fiber according to the present invention and the optical fiber amplifier.

Further, FIG. 2 shows another optical transmission system including the dispersion compensating fiber according to the present invention, wherein an optical fiber amplifier 600 is placed in the optical transmission line. Particularly, an optical fiber for amplification 610 (at least the core region of which is doped with the erbium element) of this optical fiber amplifier 600 forms a part of the transmission line of the optical transmission system.

In the optical transmission line of FIG. 2, the optical fiber one end (input end) of which is optically connected through the optical fiber transmission line 10 (single-mode optical fiber) with the transmitter TX can be made in the same configuration as the optical transmission line of the structure shown in FIG. 1 wherein the dispersion compensating fiber 100 according to the present invention is cascade-connected with the dispersion shifted fiber 500. On the other hand, an optical isolator 800 is positioned between the other end (output end) of this optical fiber transmission line 700 and one end (input end) of the above optical fiber amplifier 600 optically connected therewith, and prevents the exciting light for exciting the erbium element in the optical fiber 610 of the optical fiber amplifier 600 from propagating in the optical transmission line. The other end (output end) of this optical fiber amplifier 600 is optically connected through the optical fiber transmission line 10 (single-mode optical fiber) with the receiver RX. There is no specific restriction on the locations of the above optical fiber transmission line 700 and optical fiber amplifier 600 and the optical transmission line in the optical transmission system may be of the two-way optically communicable configuration.

The optical fiber amplifier 600 disposed in the optical transmission line of the optical transmission system as described has the optical fiber 610 at least the core region is doped with the erbium element, the excitation light source 640 for outputting the exciting light for exciting the erbium element in this optical fiber 610, to the optical fiber 610, and the optical coupler 620 for optically coupling the excitation light source 640 with the optical fiber 610. In FIG. 2 reference numeral 630 designates an anti-reflection terminal. The length of the optical fiber 610 of this optical fiber amplifier 600 is sufficiently shorter than the length of the whole optical transmission line so that contribution of the chromatic dispersion and dispersion slope thereof to the whole optical transmission line is negligible.

Further, in the optical transmission system shown in FIG. 2, the optical fiber 610 of the above optical fiber amplifier 600 can be constructed of the dispersion compensating fiber 100 according to the present invention. Specifically, when the erbium element is added in the core region of the dispersion compensating fiber 100 according to the present invention, the dispersion compensating fiber 100 functions as an optical fiber 610. In this configuration, the optical fiber transmission line 700 includes only the dispersion shifted fiber 500 excluding the dispersion compensating fiber 100.

Figure 3:
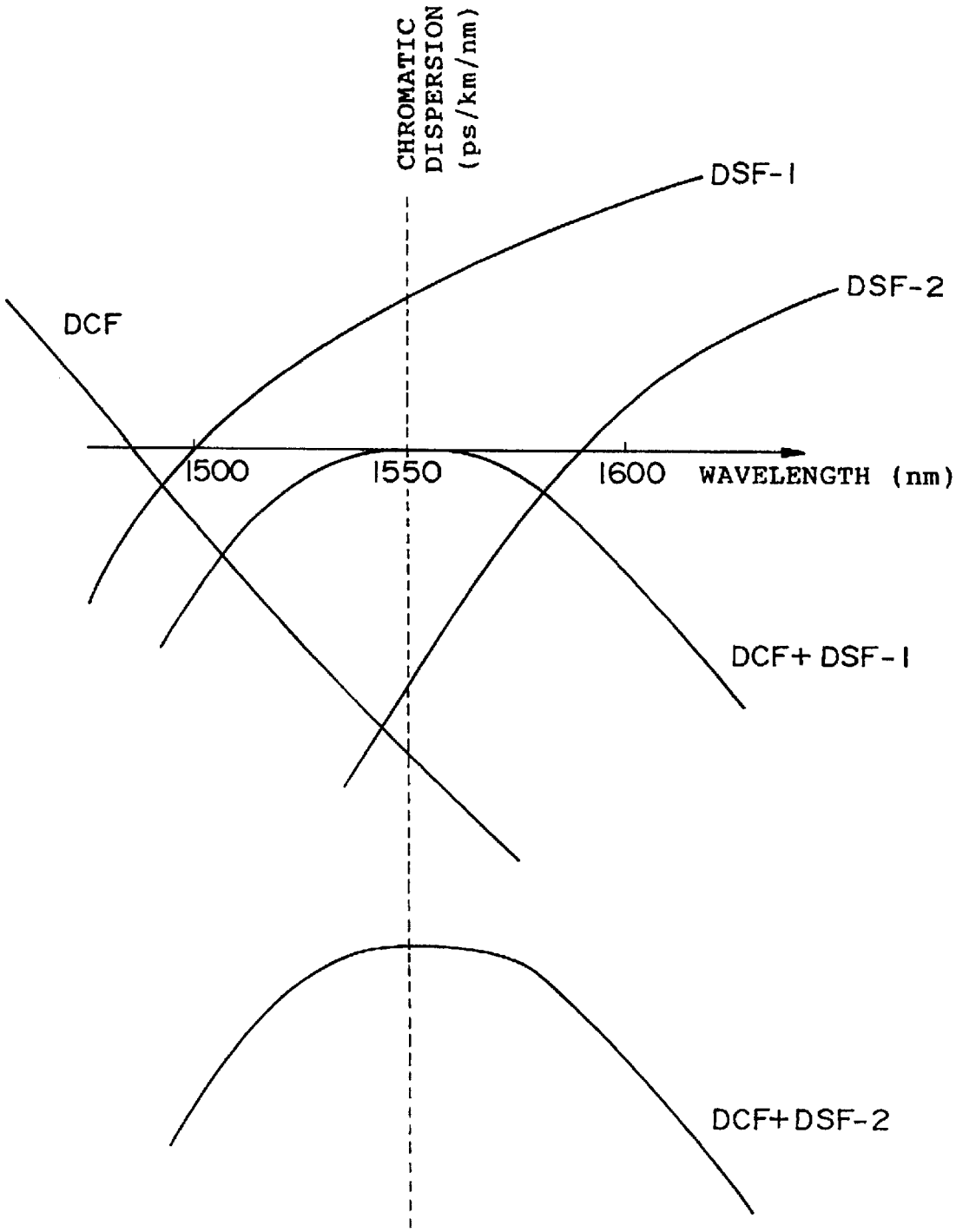
FIG. 3 is a graph for explaining the chromatic dispersion compensation and dispersion slope compensation by the dispersion compensating fiber according to the present invention.

Next described is compensation for the chromatic dispersion and dispersion slope of the dispersion compensating fiber according to the present invention. FIG. 3 is a graph for explaining compensation for the chromatic dispersion and compensation for the dispersion slope by the dispersion compensating fiber according to the present invention. In this graph, the abscissa represents the wavelength (in units of nm) of signal light and the ordinate the chromatic dispersion (in units of ps/km/nm).

In the graph, a curve indicated by symbol DCF represents chromatic dispersion characteristics of the dispersion compensating fiber according to the present invention (the dispersion compensating fiber will be referred to as DCF). In the dispersion compensating fiber DCF according to the present invention, as described above, the chromatic dispersion in the 1.55 μm band is set in the range of −40 to 0 ps/km/nm and the dispersion slope in the range of −0.5 to −0.1 ps/km/nm$^2$.

In the graph a curve represented by symbol DSF-1 indicates chromatic dispersion characteristics of the dispersion shifted fiber (the dispersion shifted fiber will be referred to as DSF-1). In this dispersion shifted fiber DSF-1, the structural dispersion is designed properly so that the chromatic dispersion is zero near the wavelength 1.5 μm and so that the dispersion slope is positive in the 1.55 μm band. This dispersion shifted fiber DSF-1 has, for example, the chromatic dispersion of 3 ps/km/nm and the dispersion slope of 0.065 ps/km/nm$^2$ at the wavelength 1.55 μm.

With the optical transmission line in which the dispersion compensating fiber DCF according to the present invention and the dispersion shifted fiber DSF-1 are cascade-connected at an appropriate ratio of respective lengths (the chromatic dispersion characteristics of the whole of this optical transmission line are indicated by a curve represented by "DCF+DSF-1" in the graph), the total chromatic dispersion is almost zero and the total dispersion slope is within the range of −0.02 to +0.05 ps/km/nm$^2$ and thus almost flat. In this way, the absolute values of respective chromatic dispersion and dispersion slope of the whole optical transmission line becomes smaller than those of the chromatic dispersion and dispersion slope of either one of the dispersion compensating fiber DCF and the dispersion shifted fiber DSF-1. Namely, the both chromatic dispersion and dispersion slope of the dispersion shifted fiber DSF-1 are effectively compensated for by the dispersion compensating fiber DCF in the 1.55 μm band.

As for each of the transmission loss and polarization mode dispersion (PMD) of the whole optical transmission line where the dispersion compensating fiber DCF according to the present invention is connected with the above dispersion shifted fiber DSF-1, no problem will arise in carrying out long-distance and high-bit-rate optical communication. As for each of the mode field diameter (MFD), cut-off wavelength, and bending loss, each should be evaluated for either one of the dispersion compensating fiber DCF according to the present invention and the above dispersion shifted fiber DSF-1 singly, but they will raise no problem in carrying out long-distance and high-bit-rate optical communication even in the optical transmission line wherein they are cascade-connected with each other. Accordingly, the chromatic dispersion is improved in for each signal light component in the 1.55 μm band even in communication by the WDM method, and the other characteristic values raise no problem in carrying out optical communication, thus enabling longer-distance and higher-bit-rate optical communication.

In contrast with it, a curve represented by symbol DSF-2 in the graph shows chromatic dispersion characteristics of a dispersion shifted fiber the chromatic dispersion of which is zero near the wavelength 1.6 μm (this dispersion shifted fiber will be referred to as DSF-2). In the optical transmission line wherein this dispersion shifted fiber DSF-2 is cascade-connected with the dispersion compensating fiber DCF according to the present invention (the chromatic dispersion characteristics of this entire optical transmission line are indicated by a curve represented by "DCF+DSF−2" in the graph), the overall chromatic dispersion slope is almost flat in the 1.55 μm band, but the overall chromatic dispersion is negative and the absolute values thereof are great.

(First Embodiment)

Figure 4:
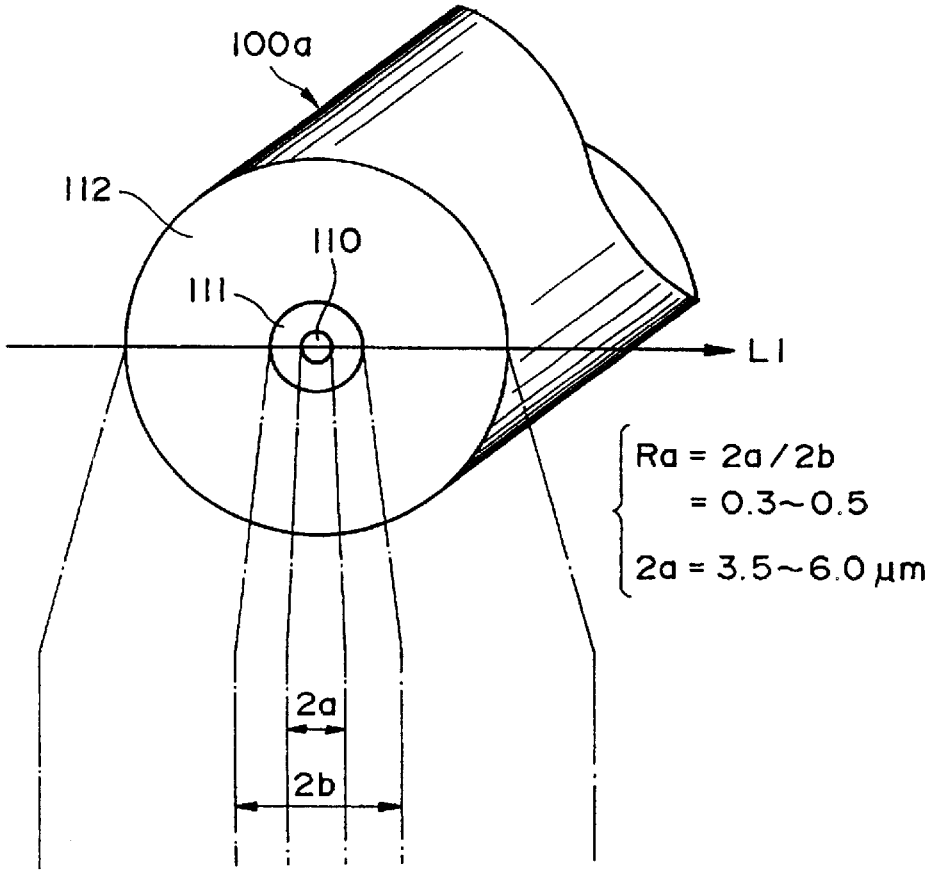
[FIG. 4 is a drawing]
Figure 4A:
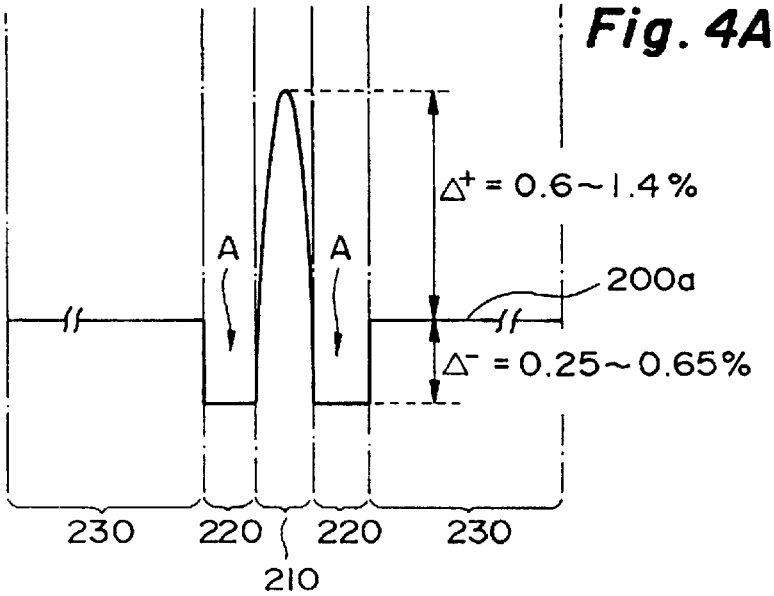

[FIG. 4 is a drawing]*FIG. 4 and FIG. 4A are drawings* to show the cross-sectional structure and index profile of the first embodiment (having the double cladding structure) of the dispersion compensating fiber according to the present invention.

As shown in this FIG. 4, the dispersion compensating fiber 100a (first embodiment) having the double cladding structure is a single-mode optical fiber the main ingredient of which is silica glass, which has a core region 110 having predetermined refractive indices, an inside cladding region 111 being a glass region provided on the periphery of the core region 110 and having a lower refractive index than the core region 110, and an outside cladding region 112 provided on the periphery of the inside cladding region 111 and having a higher refractive index than the inside cladding region 111 and a lower refractive index than the core region 110.

A ratio Ra (=2a/2b) of the outer diameter 2a of the core region 110 to the outer diameter 2b of the inside cladding region 111 is not less than 0.3 and not more than 0.5 and the outer diameter of the core region is not less than 3.5 μm and not more than 6.0 μm. [A]*As shown in FIG. 4A,* relative refractive index difference $\Delta^+$ between the outside cladding region 112 and a portion with the maximum refractive index in the core region 110 is not less than 0.6% and not more than 1.4% and a relative refractive index difference $\Delta^-$ between the outside cladding region 112 and a portion having the minimum refractive index in the inside cladding region 111 is not less than 0.25% and not more than 0.65%.

The abscissa of the index profile 200a shown in FIG. 4*A* corresponds to positions on the line L1 in the cross section (the plane normal to the traveling direction of signal light propagating) of the dispersion compensating fiber 100a. Further, in this index profile 200a, region 210 corresponds to the refractive index ($n_{core}$) at each portion on the line L1 of the above core region 110, region 220 to the refractive index ($n_{clad1}$) at each portion on the line L1 of the above inside cladding 111, and region 230 to the refractive index ($n_{clad2}$) at each portion on the line L1 of the above outside cladding region 112. In this embodiment the radial index profile of the core region 110 is of the graded-index type, and the refractive index of the inside cladding region 111 is smaller than those of the other glass regions, so that depressions A are formed in the index profile 200a of the dispersion compensating fiber 110a. Particularly, the index profile provided with such depressions A is called as a depressed cladding type profile.

The relative refractive index differences Δ in this embodiment are defined as follows.

$\Delta^+=(n_{core}-n_{clad2})/n_{clad2}$ $\Delta^-=(n_{clad2}-n_{clad1})/n_{clad2}$ $n_{core}$: maximum refractive index of the core region $n_{clad1}$: minimum refractive index of the inside cladding region $n_{clad2}$: refractive index of the outside cladding region Therefore each of the parameters in this first embodiment (double cladding structure) is determined as follows.

$$\Delta^+=0.6 \text{ to } 1.4\% \quad (1)$$

$$\Delta^-=0.25 \text{ to } 0.65\% \quad (2)$$

$$2a=3.5 \text{ to } 6.0\ \mu m \quad (3)$$

$$Ra=0.3 \text{ to } 0.5 \quad (4)$$

In this specification the relative refractive index differences between the glass regions are indicated in percentages.

The relative refractive index differences as represented by above Eq. (1) and Eq. (2) can be realized in the case of the optical fiber the main ingredient of which is silica glass, for example, by the core region 110 doped with the germanium element (Ge) being an index increasing material and the inside cladding region 110 doped with the fluorine element (F) being an index decreasing material. The outside cladding region 112 may also contain the fluorine element. The dispersion compensating fiber 100a of this first embodiment is fabricated easily, for example, by the VAD (Vapor-phase Axial Deposition) process. Since the specified tolerances of the above parameters are relatively wide, fabrication is also easy in this respect.

(Second Embodiment)

Figure 5:
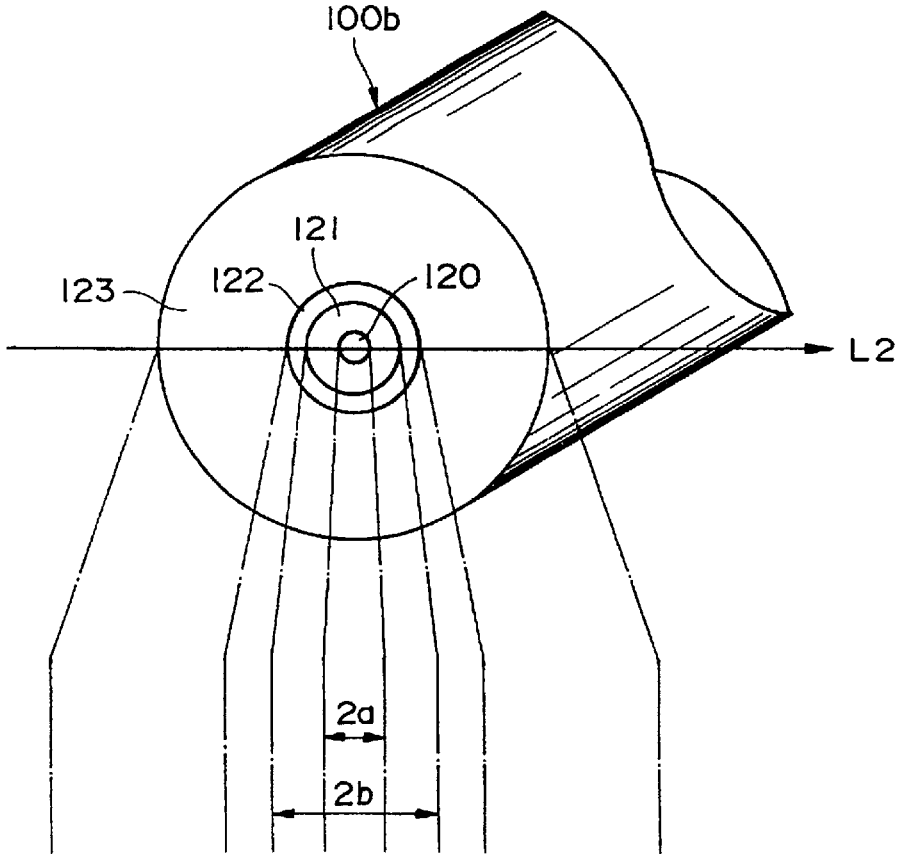
[FIG. 5 is a drawing]
Figure 5A:
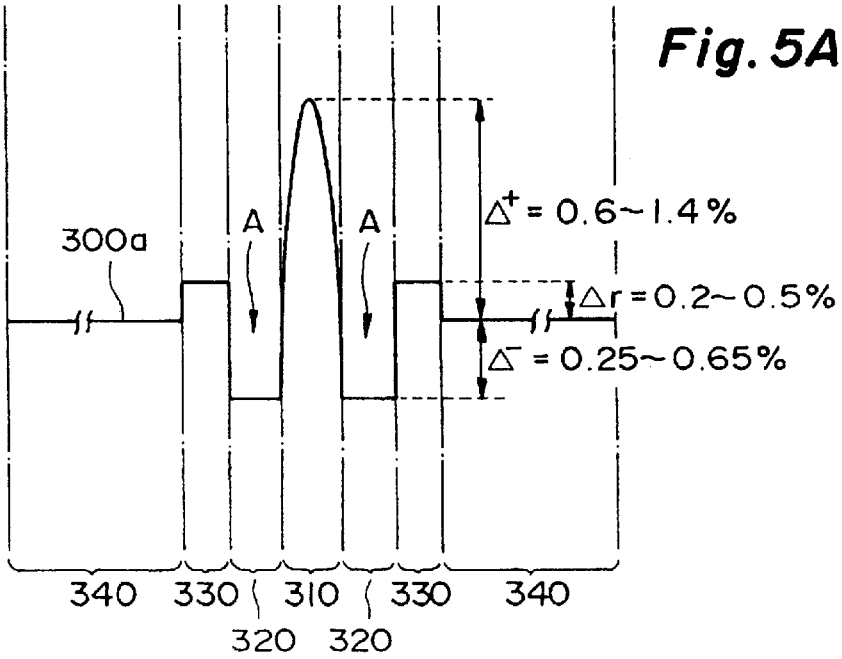

[FIG. 5 is a drawing]*FIG. 5 and FIG. 5A are drawings* to show the cross-sectional structure and index profile of the second embodiment (having the triple cladding structure) of the dispersion compensating fiber according to the present invention.

As shown in this FIG. 5, the dispersion compensating fiber 100b (the second embodiment) having the triple cladding structure is a single-mode optical fiber the main ingredient of which is silica glass, which comprises a core region 120 having predetermined refractive indices, an inside cladding region 121 being a glass region provided on the periphery of the core region 120 and having a lower refractive index than the core region 120, an intermediate cladding region 122 provided on the periphery of the inside cladding region 121 and having a higher refractive index than the inside cladding region 121 and a lower refractive index than the core region 120, and an outside cladding region 123 provided on the periphery of the intermediate cladding region 122 and having a refractive index lower than the intermediate cladding region 122 and higher than the inside cladding region 121.

The ratio Ra (=2a/2b) of the outer diameter 2a of the core region 120 to the outer diameter 2b of the inside cladding region 121 and the outer diameter of the core region 120 are preferably set in wider ranges than those of the first embodiment described above (Ra=0.3 to 0.5; 2a=3.5 $\mu$m to 6.0 $\mu$m). Thus, the outer diameter of the core region is not less than 3.5 $\mu$m and not more than 6.0 $\mu$m. [The]*As shown in FIG. 5A, the* relative refractive index difference $\Delta^+$ between the outside cladding region 123 and the portion with the maximum refractive index in the core region 120 is not less than 0.6% and not more than 1.4% and the relative refractive index difference $\Delta^-$ between the outside cladding region 123 and the portion having the minimum refractive index in the inside cladding region 121 is not less than 0.25% and not more than 0.65%, which are the same as those in the first embodiment described above.

The abscissa of the index profile 300a shown in FIG. 5*A* corresponds to each position on the line L2 in the cross section (the plane normal to the traveling direction of signal light propagating) of the dispersion compensating fiber 100b. Further, in this index profile 300a, region 310 corresponds to the refractive index ($n_{core}$) at each portion on the line L2 of the above core region 120, region 320 to the refractive index ($n_{clad1}$) at each portion on the line L2 of the above inside cladding 121, region 330 to the refractive index ($n_{clad2}$) at each portion on the line L2 of the above intermediate cladding region 122, and region 340 to the refractive index ($n_{clad3}$) at each portion on the line L2 of the above outside cladding region 123. In this embodiment the radial index profile of the core region 120 is of the graded-index type, and the refractive index of the inside cladding region 121 is lower than those of the other glass regions, so that depressions A are formed in the index profile 300a of the dispersion compensating fiber 100b. Particularly, the index profile provided with such depressions A is called a depressed cladding type profile.

The relative refractive index differences $\Delta$ in this embodiment are defined as follows.

$\Delta^+=(n_{core}-n_{clad3})/nclad3$ $\Delta^-=(n_{clad3}-n_{clad1})/n_{clad3}$ $\Delta_r=(n_{clad2}-n_{clad3})/n_{clad3}$ $n_{core}$: maximum refractive index of the core region $n_{clad1}$: minimum refractive index of the inside cladding region $n_{clad2}$: maximum refractive index of the intermediate cladding region $n_{clad3}$: refractive index of the outside cladding region Therefore, in this second embodiment (the triple cladding structure), the relative refractive index difference between the outside cladding region 123 and the portion having the maximum refractive index in the intermediate cladding region 122 is given as follow.

$$\Delta_r=0.2 \text{ to } 0.5\% \quad (5)$$

The other relative refractive index differences $\Delta^+$, $\Delta^-$ are determined in the same ranges as those in the first embodiment (the double cladding structure) described above and the ranges of the outer diameter 2a of the core region 120 and the outer diameter ratio Ra are broader than those in the first embodiment. In this specification the relative refractive index differences between the glass regions are indicated in percentages.

The index profile 300a as shown in FIG. 5*A* can be realized by the core region 120 and intermediate cladding region 122 doped with the germanium element being an index increasing material and the inside cladding region 121 doped with the fluorine element being an index decreasing material. The outside cladding region 123 may also contain the fluorine element.

(Third Embodiment)

Figure 6:
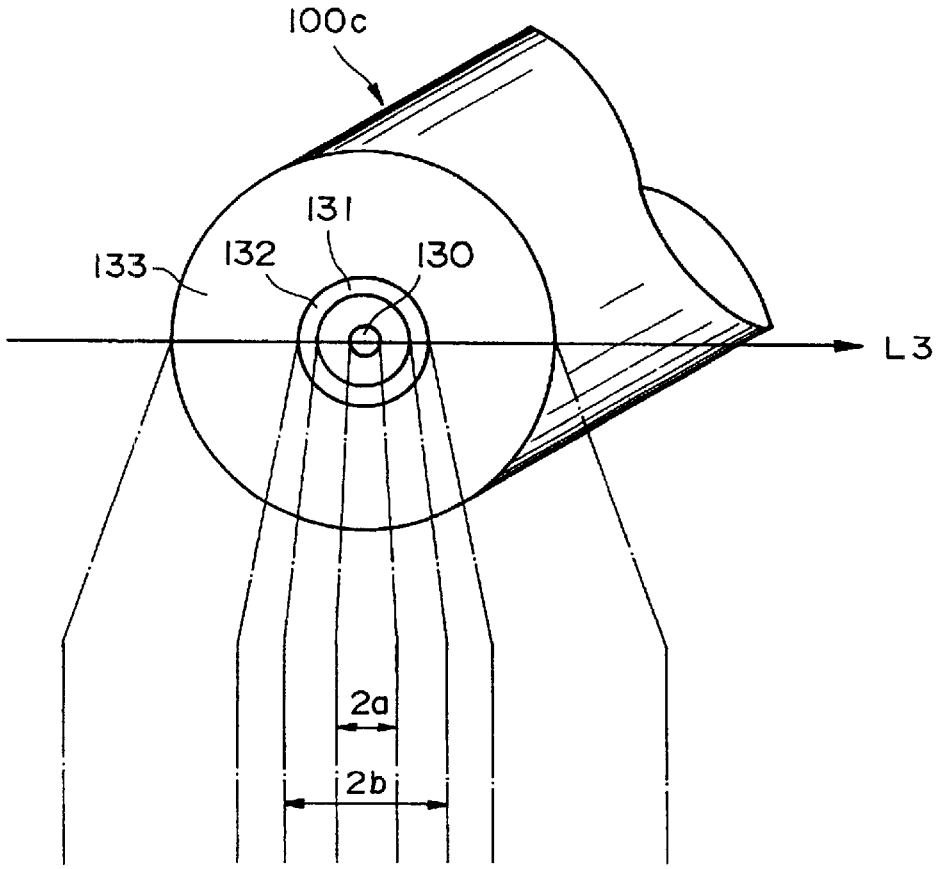
[FIG. 6 is a drawing]
Figure 6A:
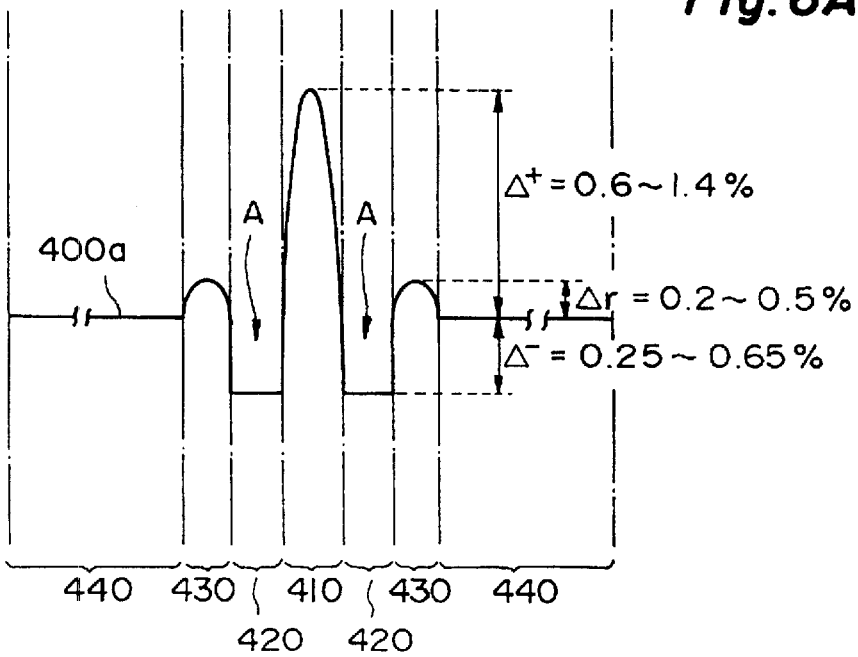

[FIG. 6 is a drawing]*FIG. 6 and FIG. 6A are drawings* to show the cross-sectional structure and index profile of the third embodiment (having the triple cladding structure) of the dispersion compensating fiber according to the present invention. This third embodiment is different from the second embodiment described above in that the radial index profile of the intermediate cladding region is of the graded-index type (whereas the radial index profile of the intermediate cladding region in the second embodiment was of the step-index type).

As shown in this FIG. 6, the dispersion compensating fiber 100c (the third embodiment) having the triple cladding structure is a single-mode optical fiber the mean ingredient of which is silica glass, which has the structure similar to that of the second embodiment described above. The dispersion compensating fiber 100c has a core region 130 having predetermined refractive indices, an inside cladding region 131 being a glass region provided on the periphery of the core region 130 and having a lower refractive index than the core region 130, an intermediate cladding region 132 provided on the periphery of the inside cladding region 131 and having higher refractive indices than the inside cladding region 131, and an outside cladding region 133 provided on the periphery of the intermediate cladding region 132 and having a refractive index lower than the intermediate cladding region 132 and higher than the inside cladding region 131.

The abscissa of the index profile 400a shown in FIG. 6*A* corresponds to each position on the line L3 in the cross section (the plane normal to the traveling direction of signal light propagating) of the dispersion compensating fiber 100c. Further, in this index profile 400a, region 410 corresponds to the refractive index ($n_{core}$) at each portion on the line L3 of the above core region 130, region 420 to the refractive index ($n_{clad1}$) at each portion on the line L3 of the above inside cladding 131, region 430 to the refractive index ($n_{clad2}$) at each portion on the line L3 of the above intermediate cladding region 122, and region 440 to the refractive index ($n_{clad3}$) at each portion on the line L3 of the above outside cladding region 133. In this embodiment the radial index profile of the core region 130 is of the graded-index type, and the refractive index of the inside cladding region 131 is lower than those of the other glass regions, so that depressions A are formed in the index profile 400a of the dispersion compensating fiber 100c. Particularly, the index profile provided with such depressions A is called a depressed cladding type profile.

The relative refractive index differences $\Delta^+$, $\Delta^-$, and $\Delta_r$ between the glass regions, and definition and numerical values of the other parameters Ra, 2a are the same as those in the second embodiment described above.

Figure 7:
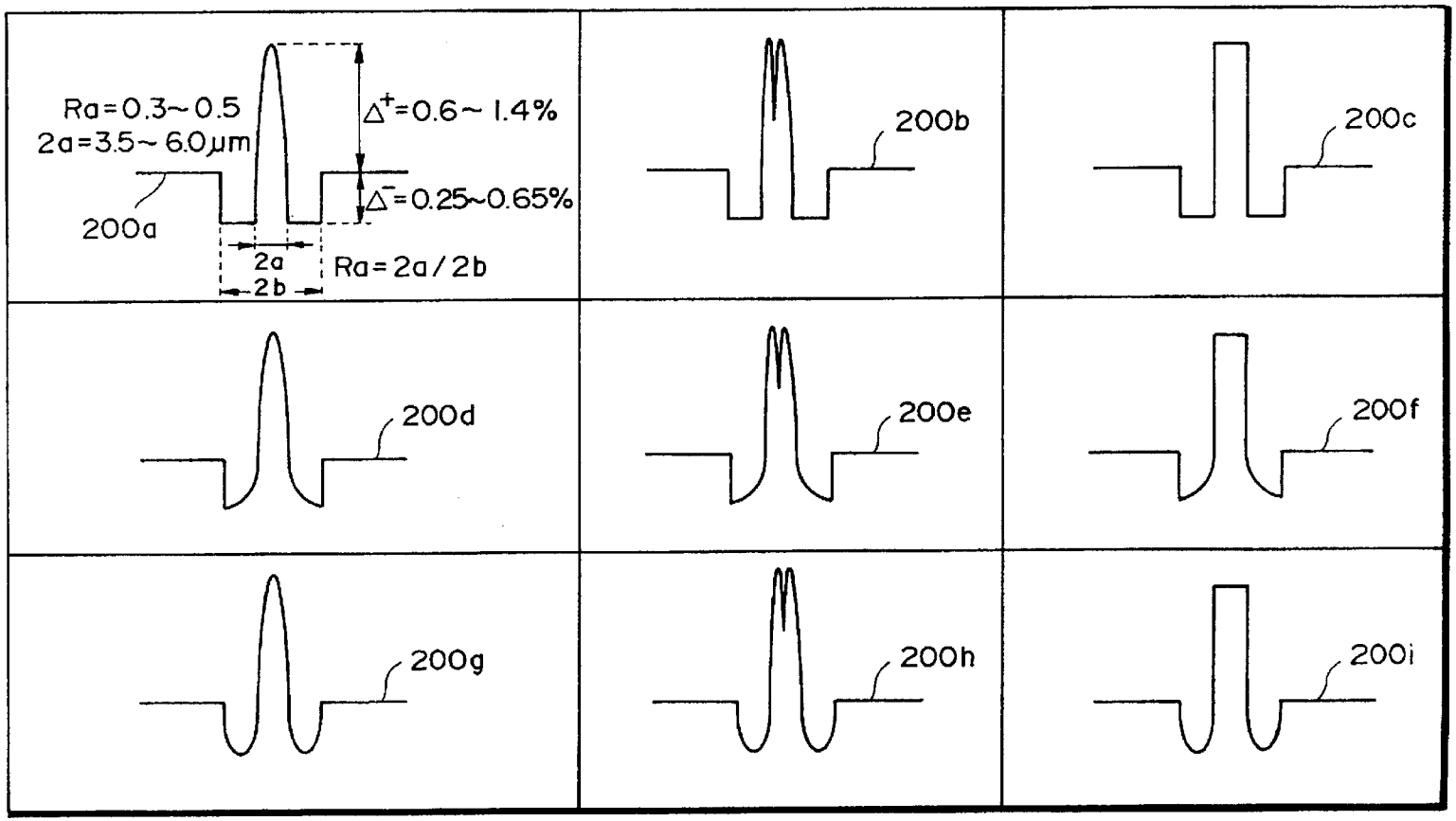
FIG. 7 is a drawing to show various application examples of the index profile (FIG. 4*A*) applicable to the first embodiment of the dispersion compensating fiber according to the present invention.
Figure 8:
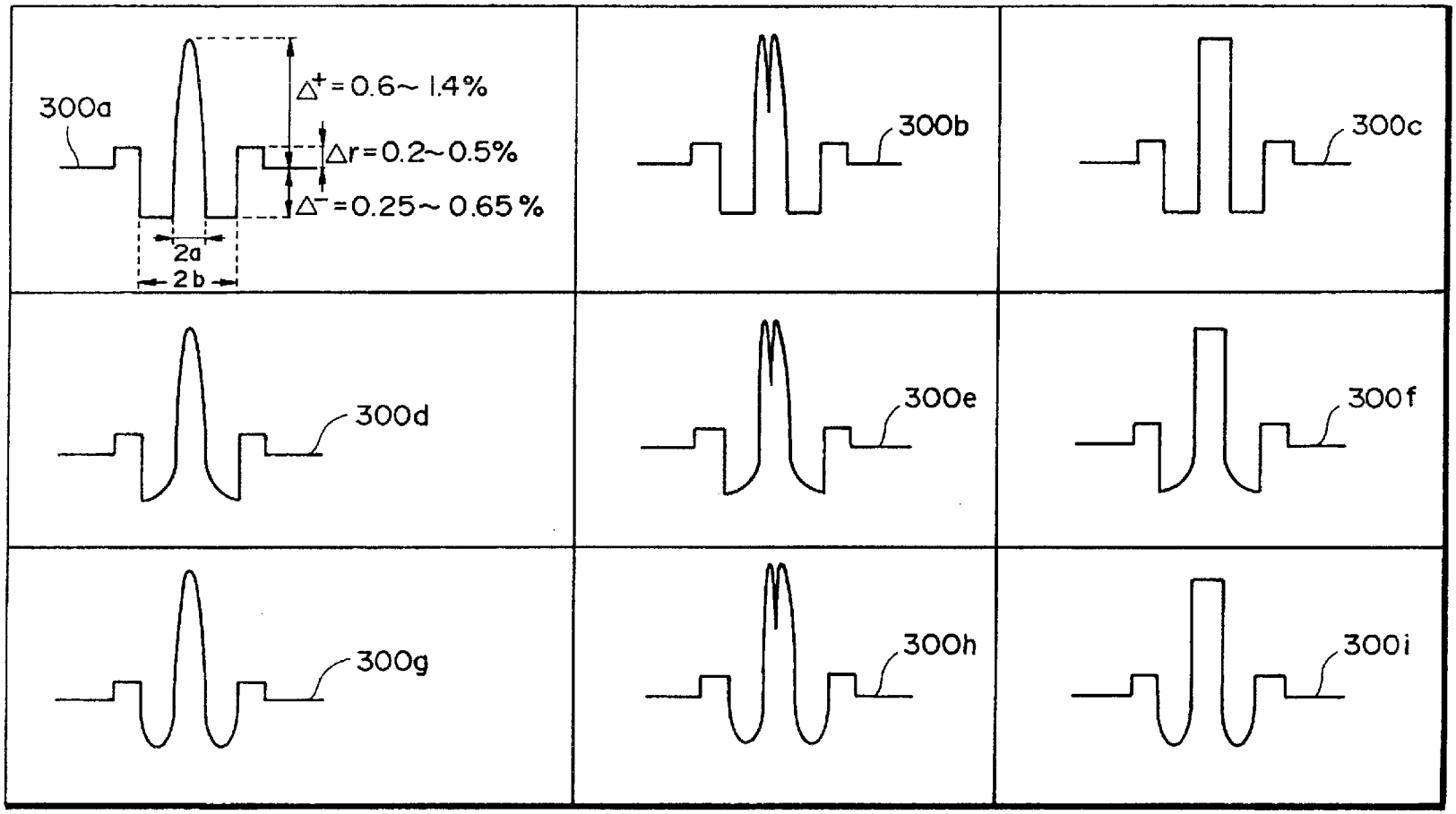
FIG. 8 is a drawing to show various application examples of the index profile (FIG. 5*A*) applicable to the second embodiment of the dispersion compensating fiber according to the present invention.
Figure 9:
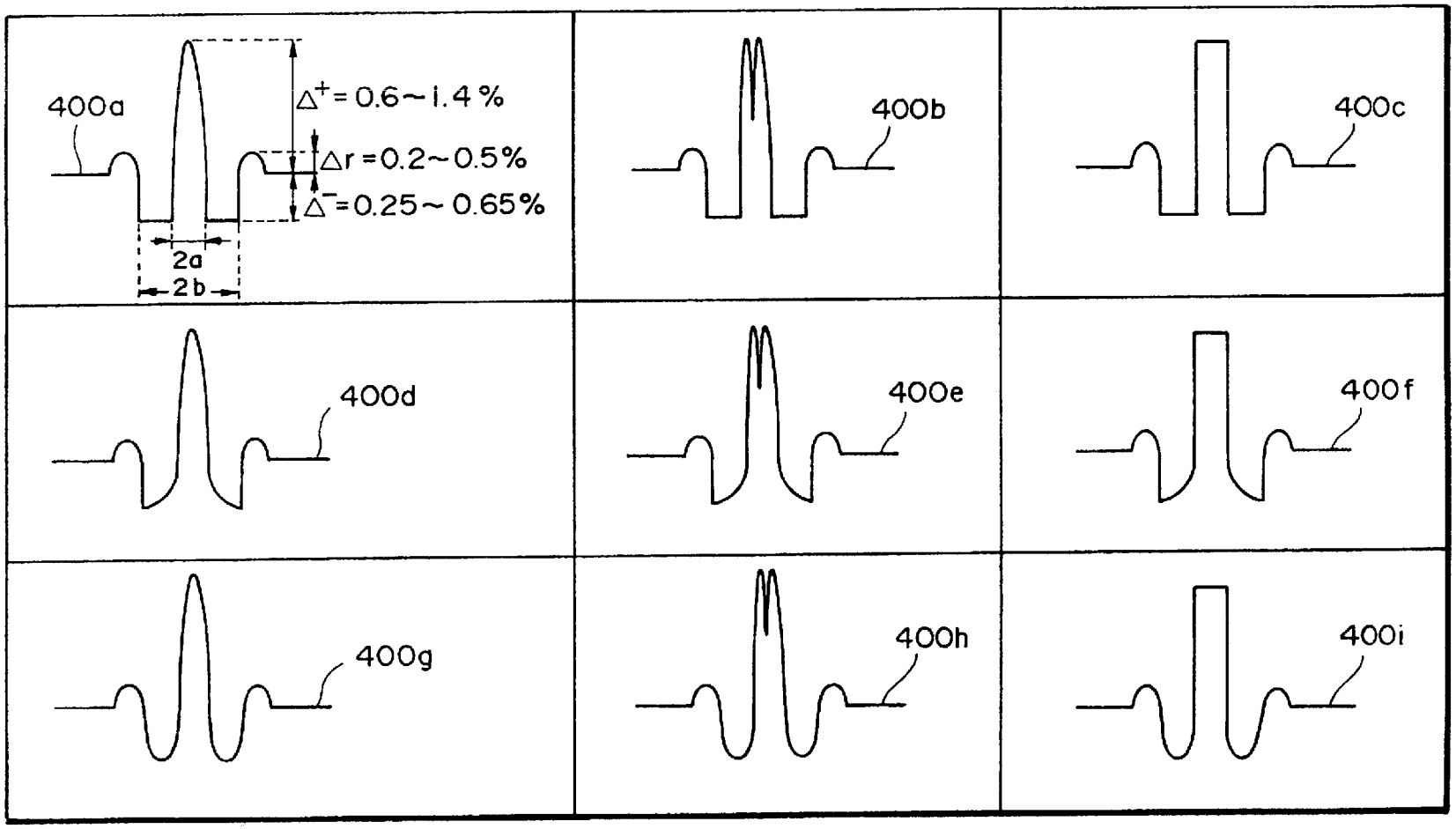
FIG. 9 is a drawing to show various application examples of the index profile (FIG. 6*A*) applicable to the third embodiment of the dispersion compensating fiber according to the present invention.

The index profiles 200a to 400a illustrated so far in [FIG. 4 to FIG. 6] *FIG. 4A, FIG. 5A and FIG. 6A* are examples of index profile for the dispersion compensating fiber according to the present invention, and, without having to be limited to these, the index profile of the dispersion compensating fiber may be either one of index profiles configured in the shapes, for example, shown in FIG. 7 to FIG. 9.

Specifically, FIG. 7 is a drawing to show modifications of the index profile 200a (the first embodiment) of FIG. 4*A*. The index profile shown at the left upper corner in the drawing is the index profile 200a of FIG. 4*A*. The index profile 200b has a drop of index in the central portion of the core region 110 in the index profile 200a of FIG. 4*A*, which is said to be easier to occur in fabrication by the MCVD (Modified Chemical Vapor Deposition) process. The index profile 200c is a modification in which the radial indices of the core region 110 in the index profile 200a of FIG. 4*A* are equalized to be of the step-index type.

Further, the index profiles 200d to 200f correspond to those 200a to 200c, respectively, described above. In the index profiles 200d to 200f the radial indices in the inside cladding region 111 are not constant, but are decreasing gradually from the center to the periphery. The index profiles 200g to 200i correspond to those 200a to 200c, respectively, described above. In the index profiles 200g to 200i the radial indices in the inside cladding region 111 are not constant, but are decreasing once and increasing again from the center to the periphery. The radial configurations of these index profiles in the inside cladding region 111 are those easy to appear in practical fabrication.

Dispersion compensating fibers having these index profiles 200b to 200i have characteristics comparable to those of the dispersion compensating fiber having the index profile 200a shown in FIG. 4*A*.

Further, FIG. 8 is a drawing to show modifications of the index profile 300a (the second embodiment) shown in FIG. 5*A*. The index profile at the left upper corner in the drawing is the index profile 300a of FIG. 5*A*. The index profile 300b has a drop of index in the central portion of the core region 120 in the index profile 300a of FIG. 5*A*. The index profile 300c is a modification in which the radial indices of the core region 120 in the index profile 300a of FIG. 5*A* are equalized to be of the step-index type.

The index profiles 300d to 300f correspond to the index profiles 300a to 300c, respectively, described above. In the index profiles 300d to 300f the radial indices of the inside cladding region 121 are not constant, but are decreasing gradually from the center to the periphery. The index profiles 300g to 300i correspond to the index profiles 300a to 300c, respectively, described above. In the index profiles 300g to 300i the radial indices of the inside cladding region 121 are not constant, but are decreasing once and increasing again from the center to the periphery.

Dispersion compensating fibers having these index profiles 300b to 300i have characteristics comparable to those of the dispersion compensating fiber having the index profile 300a shown in FIG. 5*A*.

Next, FIG. 9 is a drawing to show modifications of the index profile 400a (the third embodiment) of FIG. 6*A*. The index profile at the left upper corner in the drawing is the same as the index profile 400a of FIG. 6*A*. The index profile 400b has a drop of index in the central portion of the core region 130 in the index profile 400a of FIG. 6*A*. The index profile 400c is a modification of the index profile 400a of FIG. 6*A*, in which the radial indices in the core region 130 are equalized to be of the step-index type.

Further, the index profiles 400d to 400f correspond to the index profiles 400a to 400c, respectively, described above. In the index profiles 400d to 400f the radial indices of the inside cladding region 131 are not constant, but are decreasing gradually from the center to the periphery. The index profiles 400g to 400i correspond to the index profiles 400a to 400c, respectively, described above. In the index profiles 400g to 400i the radial indices of the inside cladding region 131 are not constant, but are decreasing once and increasing again from the center to the periphery.

Dispersion compensating fibers having these index profiles 400b to 400i have characteristics comparable to those of the dispersion compensating fiber having the index profile 400a shown in FIG. 6*A*.

Next described are experiment results of simulation conducted about characteristics of the dispersion compensating fiber having the index profile 200a shown in FIG. 4*A*. FIG. 10 is a table to show the simulation results. Eleven conditions were set as to the four parameters $\Delta^+$, $\Delta^-$, 2a, and Ra (=2a/2b) and characteristic values of optical fibers were attained. Fibers (samples) prepared corresponding to the respective conditions are denoted by No. 1 to No. 11.

Obtained for each of samples (optical fibers) No. 1 to No. 11 with input of the light of the wavelength 1.55 $\mu$m by simulation were the chromatic dispersion (indicated by Disp@1550 in the table and in units of ps/km/nm), the dispersion slope (indicated by Slope@1550 in the table and in units of ps/km/nm$^2$), the total dispersion slope of the whole optical transmission line composed of the dispersion shifted fiber being a main compensated object and either one of the above-stated optical fibers No. 1 to No. 11 cascade-connected (indicated by Total Slope @1550 in the table and in units of ps/km/nm$^2$), the transmission loss (indicated by Loss@1550 in the table and in units of dB/km), the polarization mode dispersion (indicated by PMD in the table and in units of ps.km$^{-1/2}$), the cut-off wavelength in the reference length of 2 m (indicated by Cut-Off in the table and in units of $\mu$m), and the bending loss at the diameter of 20 mm (indicated by Bend Loss in the table and in units of dB/m).

The dispersion shifted fiber assumed to be a compensated object in the simulation was one in which the chromatic dispersion at the wavelength 1.50 $\mu$m was zero and the chromatic dispersion and dispersion slope at the wavelength 1.55 μm were 3 ps/km/nm and 0.065 ps/km/nm$^3$, respectively. The total dispersion slope of the whole optical transmission line comprised of either dispersion compensating fiber of No. 1 to No. 11 described above and the above dispersion shifted fiber is a value obtained when this dispersion shifted fiber and either one of the fibers No. 1 to No. 11 are cascade-connected at a predetermined ratio of lengths so as to make the total chromatic dispersion zero at 1.55 μm.

As seen from the table of FIG. 10, in the case of fiber No. 9, the outer diameter 2a of the core region does not satisfy condition (3). Therefore, it can not be realized as a dispersion compensating fiber according to the present invention. Further neither of the fibers No. 7 and No. 8 is desirable to be applied to the optical transmission line containing the above compensated object.

However, since the other samples (fibers No. 1 to No. 6, fiber No. 10, and fiber No. 11) satisfy the all conditions of (1) to (4), each of these samples can be realized as a dispersion compensating fiber according to the present invention. Further, the total dispersion slope of the whole optical transmission line where either one of these samples is cascade-connected with the above dispersion shifted fiber is between 0.02 and 0.05 ps/km/nm$^2$, and thus is said to be almost flat. Accordingly, in carrying out optical communication with the wavelength-multiplexing signal light (containing a plurality of wavelengths) by the WDM method in the 1.55 μm band, the dispersion slope is sufficiently decreased in the wavelength region of each signal light component, thus enabling long-distance and high-bit-rate optical communication.

Among others, particularly, fibers No. 1 to No. 3 are more suitable for compensating for the chromatic dispersion and dispersion slope of each signal light component occurring in the dispersion shifted fiber, because the chromatic dispersion is in the range of −20 to −5 ps/km/nm, the dispersion slope is in the range of −0.4 to −0.13 ps/km/nm$^2$, and the total dispersion slope of the optical transmission line in the cascade connection with the dispersion shifted fiber is 0.01 to 0.02 ps/km/nm$^2$. Thus, they can be used more suitably for communication by the WDM method.

In addition, the inventors also conducted similar simulation as to the various characteristics of the dispersion compensating fibers (the triple cladding structure) having the index profile 300a shown in FIG. 5*A*. FIG 11 is a table to show the simulation results. Three conditions were set as to the five parameters $\Delta^+$, $\Delta^-$, 2a, and Ra (=2a/2b) and characteristic values of optical fibers were attained. Fibers (samples) prepared corresponding to the respective conditions are denoted by No. 12 to No. 14, respectively.

The other parameters are the same as in the case of the double cladding structure described above. The dispersion shifted fiber (object to be compensated) assumed was also the same as the aforementioned fiber.

As also seen from this table of FIG. 11, each sample (optical fiber) of No. 12 to No. 14 is more suitable for compensating for the chromatic dispersion and dispersion slope of each signal light component occurring in the dispersion shifted fiber, because the chromatic dispersion is in the range of =30 to −5 ps/km/nm, the dispersion slope is in the range of −0.39 to −0.06 ps/km/nm$^2$, and the total dispersion slope of the optical transmission line in cascade connection with the dispersion shifted fiber is 0.03 ps/km/nm$^2$. Therefore, they may be used more suitably for communication by the WDM method.

The optical transmission system to which the dispersion compensating fiber 100 according to the present invention is applied can be constructed not only in such a configuration that the dispersion compensating fiber 100 and dispersion shifted fiber 500 are cascade-connected, but also in such a configuration that the optical fiber amplifier 600 is further cascade-connected therewith, for example, as shown in FIG. 2. The dispersion compensating fiber 100 according to the present invention, the dispersion shifted fiber 500 (which, together with the dispersion compensating fiber 100, constitutes the optical fiber transmission line 700), and the optical fiber amplifier 700 may be cascade-connected in any order. The optical fiber amplifier (EDFA: Erbium Doped Fiber Amplifier), utilizing the optical fiber (EDF: Erbium Doped Fiber) doped with a rare-earth element (for example, Er element) as the optical fiber 610 of the optical fiber amplifier 600, is suitably applicable to optical amplification of wavelength-multiplexing signal light in the 1.55 μm wavelength band. The lengths of the respective dispersion compensating fiber 100 and dispersion shifted fiber 500, and the location, length and amplification factor of the optical fiber amplifier 600 are determined optimally based on the chromatic dispersion and transmission loss of each of the dispersion compensating fiber 100 and dispersion shifted fiber 500. The above configuration can effectively improve the optical transmission line in the total chromatic dispersion and dispersion slope in the optical fiber transmission system (or can decrease them to near zero) and is expected to decrease the transmission loss sufficiently. Accordingly, this configuration also permits large-bit signal light to be transmitted in a long-distance optical transmission line with little loss.

The core region of the dispersion compensating fiber itself according to the present invention may be doped with the Er element. In this case, population inversion occurs when the exciting light of the wavelength 1.48 μm from the excitation light source 640 is made to propagate through the optical coupler 620 in the dispersion compensating fiber, which amplifies the signal light propagating in the dispersion compensating fiber. Namely, this dispersion compensating fiber does not only compensate for the chromatic dispersion and dispersion slope, but also acts as an optical fiber for amplification. Therefore, the optical fiber amplifier 600 may be constructed by using this Er-doped dispersion compensating fiber as an optical fiber for amplification and further incorporating therewith the excitation light source 640 for outputting the exciting light, the optical coupler for guiding the exciting light into the dispersion compensating fiber, the optical isolator 800 for transmitting light (signal light, exciting light, and spontaneously emitted light) only in the propagating direction of signal light, a filter for transmitting only the signal light while interrupting the exciting light and spontaneously emitted light, and the like. In this case, the chromatic dispersion and dispersion slope of the dispersion shifted fiber are compensated for by the dispersion compensating fiber and the transmission loss occurring in the dispersion shifted fiber can be canceled out by the optical amplifying action in the dispersion compensating fiber.

Further, the signal light may be amplified utilizing the Raman amplification. Specifically, the exciting light having a wavelength different from the wavelength of signal light but close to that wavelength value and having sufficiently large quantity of light is made to propagate through the optical coupler 620 in the dispersion compensating fiber, thereby amplifying the signal light by the Raman effect. Also in this case, the chromatic dispersion and dispersion slope of the dispersion shifted fiber are compensated for by the dispersion compensating fiber while the transmission loss appearing in the dispersion shifted fiber can be canceled out by the optical amplifying action in the dispersion compensating fiber.

As detailed above, the characteristics of the dispersion compensating fiber according to the present invention in the 1.55 μm wavelength band are such that the chromatic dispersion is not less than −40 ps/km/nm and not more than 0 ps/km/nm, the dispersion slope is not less than −0.5 ps/km/nm$^2$ and not more than −0.1 ps/km/nm$^2$, the transmission loss is not less than 0.5 dB/km, the polarization mode dispersion is not more than 0.7 ps.km$^{-1/2}$, the mode field diameter is not less than 4.5 μm and not more than 6.5 μm, the cut-off wavelength is not less than 0.7 μm and not more than 1.7 μm, and the bending loss at the diameter of 20 mm is not more than 100 dB/m (particularly preferably, such that the chromatic dispersion is not less than −20 ps/km/nm and not more than −5 ps/km/nm and the dispersion slope is not less than −0.4 ps/km/nm$^2$ and not more than −0.13 ps/km/nm$^2$).

When this dispersion compensating fiber and another optical fiber (particularly, a dispersion shifted fiber or an optical transmission line including the dispersion shifted fiber) are optically connected at a predetermined ratio of their lengths, the total chromatic dispersion of optical transmission line can be decreased effectively in the 1.55 μm wavelength band and the total dispersion slope can also be improved in. Long-distance and high-bit-rate optical communication is made possible by these characteristics and the conditions of the respective transmission loss, polarization mode dispersion, mode field diameter, cut-off wavelength, and bending loss. Particularly, since the total chromatic dispersion of optical transmission line is improved in at the wavelength of each component of the wavelength-multiplexing signal light used in optical communication by the WDM method, longer-distance and higher-bit-rate optical communication becomes possible.

The dispersion compensating fiber according to the present invention may have either the double cladding structure of the triple cladding structure and either one of the structures can be realized by satisfying the predetermined parameter conditions (the dimensional ratio, and the relative refractive index differences between the glass regions). In the case of the dispersion compensating fiber the main ingredient of which is silica glass, the predetermined relative refractive index differences can be achieved by selectively doping each glass region with germanium or fluorine. Since the specified tolerances of the parameters are wide, fabrication is easy. Even if variation takes place in each parameter in fabrication, no problem will arise in carrying out the long-distance and high-bit-rate optical communication as long as it is within the specified tolerances.

Further, it is also possible to realize the configuration in which the core region of the dispersion compensating fiber is doped with the erbium element. Namely, when the exciting light is made to propagate in the dispersion compensating fiber, the signal light can also be amplified, while the chromatic dispersion and dispersion slope are compensated for.

In the optical transmission system according to the present invention, the dispersion compensating fiber according to the present invention is optically connected with another optical fiber (particularly, the dispersion shifted fiber) and the total dispersion slope of optical transmission line in the 1.55 μm band is set to be not less than −0.02 ps/km/nm$^2$ and not more than 0.05 ps/km/nm$^2$. Therefore, this optical transmission system enables long-distance and high-bit-rate optical communication, and particularly, in carrying out the optical communication using plural wavelengths by the WDM method, it enables longer-distance and higher-bit-rate optical communication. Further, when the erbium-doped fiber is used as the dispersion compensating fiber according to the present invention, the optical transmission line enables long-distance, high-bit-rate, and low-loss optical communication.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No.8-092692 (092692/1996) filed on Apr. 15, 1996 is hereby incorporated by reference.

What is claimed is:

1. A dispersion compensating fiber having the following characteristics for light in the 1.55 μm wavelength band:

chromatic dispersion not less than −40 ps/km/nm and not more than 0 ps/km/nm$^2$;

dispersion slope not less than −0.5 ps/km/nm$^2$ and not more than −0.1 ps/km/nm$^2$;

transmission loss not more than 0.5 dB/km;

polarization mode dispersion not more than 0.7 ps.km$^{-1/2}$;

mode field diameter not less than 4.5 μm and not more than 6.5 μm;

cut-off wavelength not less than 0.7 μm and not more than 1.7 μm in the length of 2 m; and bending loss at the diameter of 20 mm, not more than 100 dB/m.

2. The dispersion compensating fiber according to claim 1, said dispersion compensating fiber being a silica-based glass fiber, comprising at least:

a core region having a predetermined refractive index, said core region having an outer diameter not less than 3.5 μm and not more than 6.0 μm;

an inside cladding region provided on the periphery of said core region and having a lower refractive index than said core region, wherein a ratio of the outer diameter of said core region to an outer diameter of said inside cladding region is not less than 0.3 and not more than 0.5; and an outside cladding region provided on the periphery of said inside cladding region and having a higher refractive index than said inside cladding region and a lower refractive index than said core region, wherein a relative refractive index difference between said outside cladding region and a portion having a maximum refractive index in said core region is not less than 0.6% and not more than 1.4%, and wherein a relative refractive index difference between said outside cladding region and a portion having a minimum refractive index in said inside cladding region is not less than 0.25% and not more than 0.65%.

3. The dispersion compensating fiber according to claim 2, wherein said core region is doped with the germanium element and said inside cladding region is doped with the fluorine element.

4. The dispersion compensating fiber according to claim 3, wherein said outside cladding region is doped with the fluorine element.

5. The dispersion compensating fiber according to claim 2, wherein said core region is doped with the erbium element.

6. An optical transmission system having the total dispersion slope not less than −0.02 ps/km/nm$^2$ and not more than 0.05 ps/km/nm$^2$ for light in the 1.5 μm wavelength band, said optical transmission system comprising:

the dispersion compensating fiber according to claim 5;

a third optical fiber optically connected with said dispersion compensating fiber and forming a part of a transmission line;

an excitation light source for outputting exciting light for exciting the erbium element in said dispersion compensating fiber, to said dispersion compensating fiber; and an optical coupler for optically coupling said excitation light source with said dispersion compensating fiber.

7. The optical transmission system according to claim 6, wherein said third optical fiber comprises a dispersion shifted fiber zero-dispersion wavelength of which is shifted to 1560 nm or less.

8. The dispersion compensating fiber according to claim 2, further comprising an intermediate cladding region provided between said inside cladding region and said outside cladding region, said intermediate cladding region having a higher refractive index than said outside cladding region and a lower refractive index than said core region, wherein a relative refractive index difference between said outside cladding region and a portion having a maximum refractive index in said intermediate cladding region is not less than 0.2% and not more than 0.5%.

9. An optical transmission system comprising the dispersion compensating fiber according to claim 1 and a first optical fiber optically connected with said dispersion compensating fiber and forming a part of a transmission line, said optical transmission system having the total dispersion slope not less than −0.02 ps/km/nm$^2$ and not more than 0.05 ps/km/nm$^2$ for light in the 1.5 $\mu$m-wavelength band.

10. The optical transmission system according to claim 9, wherein said first optical fiber comprises a dispersion shifted fiber zero-dispersion wavelength of which is shifted to 1560 nm or less.

11. The optical transmission system according to claim 9, further comprising an optical fiber amplifier forming a part of said transmission line, said optical fiber amplifier comprising:

a second optical fiber a core region of which is doped with the erbium element;

an excitation light source for outputting exciting light for exciting the erbium element in said second optical fiber, to said second optical fiber; and an optical coupler for optically coupling said excitation light source with said second optical fiber.

12. A dispersion compensating fiber having the following characteristics for light in the 1.55 $\mu$m wavelength band:

chromatic dispersion not less than −20 ps/km/nm and not more than −5 ps/km/nm;

dispersion slope not less than −0.4 ps/km/nm$^2$ and not more than −0.13 ps/km/nm$^2$;

transmission loss not more than 0.5 dB/km;

polarization mode dispersion not more than 0.7 ps.km$^{-1/2}$;

mode field diameter not less than 4.5 $\mu$m and not more than 6.5 $\mu$m;

cut-off wavelength not less than 0.7 $\mu$m and not more than 1.7 $\mu$m in the length of 2 m; and bending loss at the diameter of 20 mm, not more than 100 dB/m.

13. The dispersion compensating fiber according to claim 12, said dispersion compensating fiber being a silica-based glass fiber, comprising at least:

a core region having a predetermined refractive index, said core region having an outer diameter not less than 3.5 $\mu$m and not more than 6.0 $\mu$m;

an inside cladding region provided on the periphery of said core region and having a lower refractive index than said core region, wherein a ratio of the outer diameter of said core region to an outer diameter of said inside cladding region is not less than 0.3 and not more than 0.5; and an outside cladding region provided on the periphery of said inside cladding region and having a higher refractive index than said inside cladding region and a lower refractive index than said core region, wherein a relative refractive index difference between said outside cladding region and a portion having a maximum refractive index in said core region is not less than 0.6% and not more than 1.4% and wherein a relative refractive index difference between said outside cladding region and a portion having a minimum refractive index in said inside cladding region is not less than 0.25% and not more than 0.65%.

14. The dispersion compensating fiber according to claim 13, wherein said core region is doped with the germanium element and said inside cladding region is doped with the fluorine element.

15. The dispersion compensating fiber according to claim 14, wherein said outside cladding region is doped with the fluorine element.

16. An optical transmission system having the total dispersion slope not less than −0.02 ps/km/nm$^2$ and not more than 0.05 ps/km/nm$^2$ for light in the 1.5 $\mu$m wavelength band, said optical transmission system comprising:

the dispersion compensating fiber according to claim 15;

a third optical fiber optically connected with said dispersion compensating fiber and forming a part of a transmission line;

an excitation light source for outputting exciting light for exciting the erbium element in said dispersion compensating fiber to said dispersion compensating fiber; and an optical coupler for optically coupling said excitation light source with said dispersion compensating fiber.

17. The optical transmission system according to claim 16, wherein said third optical fiber comprises a dispersion shifted fiber zero-dispersion wavelength of which is shifted to 1560 nm or less.

18. The dispersion compensating fiber according to claim 13, wherein said core region is doped with the erbium element.

19. The dispersion compensating fiber according to claim 13, further comprising an intermediate cladding region provided between said inside cladding region and said outside cladding region, said intermediate cladding region having a higher refractive index than said outside cladding region and a lower refractive index than said core region, wherein a relative refractive index difference between said outside cladding region and a portion having a maximum refractive index in said intermediate cladding region is not less than 0.2% and not more than 0.5%.

20. An optical transmission system comprising the dispersion compensating fiber according to claim 12 and a first optical fiber optically connected with said dispersion compensating fiber and forming a part of a transmission line, said optical transmission system having the total dispersion slope not less than −0.02 ps/km/nm$^2$ and not more than 0.05 ps/km/nm$^2$ for light in the 1.5 $\mu$m wavelength band.

21. The optical transmission system according to claim 20, wherein said first optical fiber comprises a dispersion shifted fiber zero-dispersion wavelength of which is shifted to 1560 nm or less.

22. The optical transmission system according to claim 20, further comprising an optical fiber amplifier forming a part of said transmission line, said optical fiber amplifier comprising:

a second optical fiber a core region of which is doped with the erbium element;

an excitation light source for outputting exciting light for exciting the erbium element in said second optical fiber, to said second optical fiber; and an optical coupler for optically coupling said excitation light source with said second optical fiber.

*23. A dispersion compensating fiber having the following characteristics for light in the 1.55 μm wavelength band:*

*chromatic dispersion not less than −40 ps/km/nm and not more than 0 ps/km/nm;*

*dispersion slope not less than −0.5 ps/km/nm$^2$ and not more than −0.1 ps/km/nm$^2$;*

*transmission loss not more than 0.5 dB/km;*

*polarization mode dispersion not more than 0.7 ps·km$^{-1/2}$;*

*cut-off wavelength not less than 0.7 μm and not more than 1.7 μm in the length of 2 m; and*

*bending loss at a diameter of 20 mm, not more than 100 dB/m.*

*24. The dispersion compensating fiber according to claim 23, said dispersion compensating fiber being a silica-based glass fiber, comprising at least:*

*a core region having a predetermined refractive index, said core region having an outer diameter not less than 3.5 μm and not more than 6.0 μm;*

*an inside cladding region provided on the periphery of said core region and having a lower refractive index than said core region, wherein a ratio of the outer diameter of said core region to an outer diameter of said inside cladding region is not less than 0.3 and not more than 0.5; and*

*an outside cladding region provided on the periphery of said inside cladding region and having a higher refractive index than said inside cladding region and a lower refractive index than said core region,*

*wherein a relative refractive index difference between said outside cladding region and a portion having a maximum refractive index in said core region is not less than 0.6% and not more than 1.4%, and*

*wherein a relative refractive index difference between said outside cladding region and a portion having a minimum refractive index in said inside cladding region is not less than 0.25% and not more than 0.65%.*

*25. The dispersion compensating fiber according to claim 24, wherein said core region is doped with germanium and said inside cladding region is doped with fluorine.*

*26. The dispersion compensating fiber according to claim 25, wherein said outside cladding region is doped with fluorine.*

*27. The dispersion compensating fiber according to claim 24, further comprising an intermediate cladding region provided between said inside cladding region and said outside cladding region, said intermediate cladding region having a higher refractive index than said outside cladding region and a lower refractive index than said core region,*

*wherein a relative refractive index difference between said outside cladding region and a portion having a maximum refractive index in said intermediate cladding region is not less than 0.2% and not more than 0.5%.*

*28. The dispersion compensating fiber according to claim 24, wherein said core region is doped with erbium.*

*29. A dispersion compensating fiber having the following characteristics for light in the 1.55 μm wavelength band:*

*dispersion slope not less than −0.5 ps/km/nm$^2$ and not more than −0.1 ps/km/nm$^2$;*

*transmission loss not more than 0.5 dB/km;*

*polarization mode dispersion not more than 0.7 ps·km$^{-1/2}$;*

*cutoff wavelength not less than 0.7 μm and not more than 1.7 μm at a length of 2 m and*

*bending loss at a diameter of 20 mm, not more than 100 dB/m.*

*30. The dispersion compensating fiber according to claim 29, said dispersion compensating fiber being a silica-based glass fiber, comprising at least;*

*a core region having a predetermined refractive index, said core region having an outer diameter not less than 3.5 μm and not more than 6.0 μm;*

*an inside cladding region provided on the periphery of said core region and having a lower refractive index than said core region, wherein a ratio of the outer diameter of said core region to an outer diameter of said inside cladding region is not less than 0.3 and not more than 0.5; and*

*an outside cladding region provided on the periphery of said inside cladding region and having a higher refractive index than said inside cladding region and a lower refractive index than said core region,*

*wherein a relative refractive index difference between said outside cladding region and a portion having a maximum refractive index in said core region is not less than 0.6% and not more than 1.4%, and*

*wherein a relative refractive index difference between said outside cladding region and a portion having a minimum refractive index in said inside cladding region is not less than 0.25% and not more than 0.65%.*

*31. The dispersion compensating fiber according to claim 30, further comprising an intermediate cladding region provided between said inside cladding region and said outside cladding region, said intermediate cladding region having a higher refractive index than said outside cladding region and a lower refractive index than said core region,*

*wherein a relative refractive index difference between said outside cladding region and a portion having a maximum refractive index in said intermediate cladding region is not less than 0.2% and not more than 0.5%.*

*32. The dispersion compensating fiber according to claim 30, wherein said core region is doped with germanium and said inside cladding region is doped with fluorine.*

*33. The dispersion compensating fiber according to claim 30, wherein said outside cladding region is doped with fluorine.*

*34. The dispersion compensating fiber according to claim 30, wherein said core region is doped with erbium.*

*35. An optical transmission system comprising:*

*a dispersion shifted fiber having a zero dispersion wavelength between the wavelengths from 1450 nm to 1650 nm; and*

*a dispersion compensating fiber optically coupled to said dispersion shifted fiber,*

*said optical transmission system having the total dispersion slope not less than −0.02 ps/km/nm$^2$ and not more than 0.05 ps/km/nm$^2$ for light in the 1.55 μm wavelength band.*

36. An optical transmission system according to claim 35, further comprising:

a light source coupled with said dispersion compensating fiber and for generating an excitation light into said dispersion compensating fiber to amplify a signal light in said dispersion compensating fiber by utilizing a Raman amplification, thereby to compensate loss in signal light to be transmitted in said dispersion compensating fiber which is caused in said dispersion compensating fiber.

37. An optical transmission system according to claim 36, wherein said excitation light has a wavelength different from the wavelength of signal light to be transmitted in said dispersion compensating fiber.

38. An optical transmission system according to claim 36, wherein said excitation light has a wavelength different from the wavelength of signal light to be transmitted in said dispersion compensating fiber.

39. An optical transmission system comprising:

an optical fiber having a positive dispersion and a positive dispersion slope at signal light having a 1.55 μm wavelength;

a dispersion compensating optical fiber optically coupled to said optical fiber and which compensate for the dispersion and a dispersion slope of said optical fiber at the same time; and a light source coupled with said dispersion compensating fiber and for generating an excitation light into said dispersion compensating fiber to amplify a signal light in said dispersion compensating fiber by utilizing a Raman amplification, thereby to compensate loss in signal light to be transmitted in said dispersion compensating fiber, which is caused in said dispersion compensating fiber, said optical transmission system having the total dispersion slope not less than −0.02 ps/km/nm$^2$ and not more than 0.05 ps/km/nm$^2$ for light in the 1.55 μm wavelength band.

40. An optical transmission system according to claim 39, wherein said excitation light has a wavelength different from the wavelength of signal light to be transmitted in said dispersion compensating fiber.

41. An optical transmission system comprising:

an optical fiber having a positive dispersion at signal light having a 1.55 μm wavelength;

a dispersion compensating optical fiber optically coupled to said optical fiber and which compensate for the dispersion and a dispersion slope of said optical fiber at the same time; and a light source coupled with said dispersion compensating fiber and for generating an excitation light into said dispersion compensating fiber to amplify a signal light in said dispersion compensating fiber by utilizing a Raman amplification, thereby to compensate loss in signal light to be transmitted in said dispersion compensating fiber which is caused in said dispersion compensating fiber, said optical transmission system having the total dispersion slope not less than −0.02 ps/km/nm$^2$ and not more than 0.05 ps/km/nm$^2$ for light in the 1.55 μm wavelength band.

42. An optical transmission system according to claim 41, wherein said excitation light has a wavelength different from the wavelength of signal light to be transmitted in said dispersion compensating fiber.

43. A dispersion compensating optical fiber to be connected to a fiber having at least one of a positive dispersion and a positive dispersion slope at signal light having a wavelength in the 1.55 μm wavelength band and in which transmission loss in signal light is compensated by Raman amplification generated in said dispersion compensating optical fiber by insertion of an excitation light having a predetermined wavelength, said dispersion compensating optical fiber having the following characteristics for light in the 1.55 μm wavelength band;

dispersion slope not less than −0.5 ps/km/nm$^2$ and not more than −0.1 ps/km/nm$^2$;

transmission loss not more than 0.5 dB/km;

polarization mode dispersion not more than 0.7 ps·km$^{-1/2}$;

cut-off wavelength not less than 0.7 μm and not more than 1.7 μm in the length of 2 m; and bending loss at the diameter of 20 mm, not more than 100 dB/m, whereby, when said dispersion compensating optical fiber is connected to said dispersion shifted fiber, an optical transmission system consisting of said fiber and said dispersion compensating optical fiber has the total dispersion slope not less than −0.02 ps/km/nm$^2$ and not more than 0.05 ps/km/nm$^2$ for light in the 1.55 μm wavelength band.

44. A dispersion compensating optical fiber to be connected to a dispersion shifted fiber having a zero dispersion wavelength between the wavelengths from 1450 nm to 1650 nm, said dispersion compensating optical fiber having the following characteristics for light in the 1.55 μm wavelength band;

dispersion slope not less than −0.5 ps/km/nm$^2$ and not more than −0.1 ps/km/nm$^2$;

transmission loss not more than 0.5 dB/km;

polarization mode dispersion not more than 0.7 ps·km$^{-1/2}$;

cut-off wavelength not less than 0.7 μm and not more than 1.7 μm in the length of 2 m; and bending loss at a diameter of 20 mm, not more than 100 dB/m, whereby, when said dispersion compensating optical fiber is connected to said dispersion shifted fiber and an excitation light having a predetermined wavelength is inserted into said dispersion compensating optical fiber, the loss in the signal light in an optical transmission system consisting of said dispersion shifted fiber and said dispersion compensating optical fiber is compensated by the Raman amplification generated by the insertion of the excitation light so that said optical transmission system has the total dispersion slope not less than −0.02 ps/km/nm$^2$ and not more than 0.05 ps/km/nm$^2$ for light in the 1.55 μm wavelength band.

45. A dispersion compensating optical fiber to be connected to a dispersion shifted fiber having a zero dispersion wavelength between the wavelengths from 1450 nm to 1650 nm, said dispersion compensating fiber having the following characteristics for light in the 1.55 μm wavelength band:

chromatic dispersion not less than −40 ps/km/nm and not more than 0 ps/km/nm;

dispersion slope not less than −0.5 ps/km/nm$^2$ and not more than −0.1 ps/km/nm$^2$;

transmission loss not more than 0.5 dB/km;

polarization mode dispersion not more than 0.7 ps·km$^{-1/2}$;

cut-off wavelength not less than 0.7 μm and not more than 1 7 μm in the length of 2 m; and bending loss at the diameter of 20 mm, not more than 100 dB/m,

*whereby, when said dispersion compensating optical fiber is connected to said dispersion shifted fiber and an excitation light having a predetermined wavelength is inserted into said dispersion compensating optical fiber, the loss in the signal light in an optical transmission system consisting of said dispersion shifted fiber and said dispersion compensating optical fiber is compensated by the Raman amplification generated by the insertion of the excitation light so that said optical transmission system has the total dispersion slope not less than −0.02 ps/km/nm$^2$ and not more than 0.05 ps/km/nm$^2$ for light in the 1.55 μm wavelength band.*

*46. A dispersion compensating optical fiber to be connected to a dispersion shifted fiber having at least one of a positive dispersion and a positive dispersion slope at signal light having the wavelength of 1.55 μm wavelength band, said dispersion compensating fiber having the following characteristics for light in the 1.55 μm wavelength band:*

*chromatic dispersion not less than −40 ps/km/nm and not more than 0 ps/km/nm;*

*dispersion slope not less than −0.5 ps/km/nm$^2$ and not more than −0.1 ps/km/nm$^2$;*

*transmission loss not more than 0.5 dB/km;*

*polarization mode dispersion not more than 0.7 ps·km$^{-1/2}$;*

*cut-off wavelength not less than 0.7 μm and not more than 1.7 μm in the length of 2 m; and*

*bending loss at a diameter of 20 mm, not more than 100 dB/m,*

*whereby, when said dispersion compensating optical fiber is connected to said dispersion shifted fiber and an excitation light having a predetermined wavelength is inserted into said dispersion compensating optical fiber, the loss in the signal light in an optical transmission system consisting of said dispersion shifted fiber and said dispersion compensating optical fiber is compensated by the Raman amplification generated by the insertion of the excitation light so that said optical transmission system has the total dispersion slope not less than −0.02 ps/km/nm$^2$ and not more than 0.05 ps/km/nm$^2$ for light in the 1.55 μm wavelength band.*

*47. An optical transmission system said optical transmission system comprising:*

*an optical fiber having a zero dispersion wavelength between the wavelengths from 1450 nm to 1650 nm;*

*a dispersion compensating fiber optically coupled to said optical fiber and having the following characteristics for light in the 1.55 μm wavelength band;*

*dispersion slope not less than −0.5 ps/km/nm$^2$ and not more than −0.1 ps/km/nm$^2$;*

*transmission loss not more than 0.5 dB/km;*

*polarization mode dispersion not more than 0.7 ps·km$^{-1/2}$;*

*cut-off wavelength not less than 0.7 μm and not more than 1.7 μm in the length of 2 m; and*

*bending loss at a diameter of 20 mm, not more than 100 dB/m; and*

*a light source coupled with said dispersion compensating fiber and for generating an excitation light into said dispersion compensating fiber to amplify a signal light in said dispersion compensating fiber by utilizing a Raman amplification, thereby to compensate loss in signal light to be transmitted in said dispersion compensating fiber, which is caused in said dispersion compensating fiber, said optical transmission system having the total dispersion slope not less than −0.02 ps/km/nm$^2$ and not more than 0.05 ps/km/nm$^2$ for light in the 1.55 μm wavelength band.*

*48. An optical transmission system comprising:*

*an optical fiber having at least one of a positive dispersion and a positive dispersion slope at signal light having a 1.55 μm wavelength;*

*a dispersion compensating fiber optically coupled to said optical fiber and having the following characteristics for light in the 1.55 μm wavelength band;*

*dispersion slope not less than −0.5 ps/km/nm$^2$ and not more than −0.1 ps/km/nm$^2$;*

*transmission loss not more than 0.5 dB/km;*

*polarization mode dispersion not more than 0.7 ps·km$^{-1/2}$;*

*cut-off wavelength not less than 0.7 μm and not more than 1.7 μm in the length of 2 m; and*

*bending loss at a diameter of 20 mm, not more than 100 dB/m; and*

*a light source coupled with said dispersion compensating fiber and for generating an excitation light into said dispersion compensating fiber to amplify a signal light in said dispersion compensating fiber by utilizing a Raman amplification, thereby to compensate loss in signal light to be transmitted in said dispersion compensating fiber, which is caused in said dispersion compensating fiber, said optical transmission system having the total dispersion slope not less than −0.02 ps/km/nm$^2$ and not more than 0.05 ps/km/nm$^2$ for light in the 1.55 μm wavelength band.*

*49. An optical transmission system comprising:*

*an optical fiber having at least one of a positive dispersion and a positive dispersion slope at signal light having a 1.55 μm wavelength;*

*a dispersion compensating fiber optically coupled to said optical fiber and having the following characteristics for light in the 1.55 μm wavelength band;*

*chromatic dispersion not less than −40 ps/km/nm and not more than 0 ps/km/nm;*

*dispersion slope not less than −0.5 ps/km/nm$^2$ and not more than −0.1 ps/km/nm$^2$;*

*transmission loss not more than 0.5 dB/km;*

*polarization mode dispersion not more than 0.7 ps·km$^{-1/2}$;*

*cut-off wavelength not less than 0.7 μm and not more than 1.7 μm in the length of 2 m; and*

*bending loss at a diameter of 20 mm, not more than 100 dB/m; and*

*a light source coupled with said dispersion compensating fiber and for generating an excitation light into said dispersion compensating fiber to amplify a signal light in said dispersion compensating fiber by utilizing a Raman amplification, thereby to compensate loss in signal light to be transmitted in said dispersion compensating fiber, which is caused in said dispersion compensating fiber, said optical transmission system having the total dispersion slope not less than −0.02 ps/km/nm$^2$ and not more than 0.05 ps/km/nm$^2$ for light in, the 1.55 μm wavelength band.*

*50. An optical transmission system comprising:*

*a dispersion shifted fiber having a zero dispersion wavelength between the wavelengths from 1450 nm to 1650 nm a dispersion shifted fiber having a zero dispersion wavelength between the wavelengths from 1450 nm to 1650 nm wavelength;*

*a dispersion compensating fiber optically coupled to said optical fiber and having the following characteristics for light in the 1.55 μm wavelength band;*

*chromatic dispersion not less than −40 ps/km/nm and not more than 0 ps/km/nm;*

*dispersion slope not less than −0.5 ps/km/nm$^2$ and not more than −0.1 ps/km/nm$^2$;*

*transmission loss not more than 0.5 dB/km;*

*polarization mode dispersion not more than 0.7 ps·km$^{-1/2}$;*

*cut-off wavelength not less than 0.7 μm and not more than 1.7 μm in the length of 2 m; and*

*bending loss at a diameter of 20 mm, not more than 100 dB/m; and*

*a light source coupled with said dispersion compensating fiber and for generating an excitation light into said dispersion compensating fiber to amplify a signal light in said dispersion compensating fiber by utilizing a Raman amplification thereby to compensate loss in signal light to be transmitted in said dispersion compensating fiber, which is caused in said dispersion compensating fiber, and said optical transmission system having the total dispersion slope not less than −0.02 ps/km/nm$^2$ and not more than 0.05 ps/km/nm$^2$ for light in the 1.55 μm wavelength band.*

*51. A dispersion compensating optical fibre to be connected to a dispersion shifted fiber having at least one fo a positive dispertion and a positive dispersion slope at signal light having a wavelength of 1.55 μm wavelength band, said dispersion compensating fiber having the following characteristics for light in the 1.55 μm wavelength band:*

*dispersion slope not less than −0.5 ps/km/nm$^2$ and not more than −0.1 ps/km/nm$^2$;*

*transmission loss not more than 0.5 dB/km;*

*polarization mode dispersion not more than 0.7 ps·km$^{-1/2}$;*

*cut-off wavelength not less than 0.7 μm and not more than 1.7 μm in the length of 2 m; and*

*bending loss at the diameter of 20 mm not more than 100 dB/m,*

*whereby, when said dispersion compensating optical fiber is connected to said dispersion shifted fiber and an excitation light having a predetermined wavelength is inserted inot said dispersion compensating optical fiber, the loss in the signal light in an optical transmission system consisting of said dispersion shifted fiber and said dispersion compensating optical fiber is compensated by the Raman amplification generated by the insertion of the excitation light so that said optical transmission system has a total dispersion slope not less than −0.02 ps/km/nm$^2$ and not more than 0.05 ps/km/nm$^2$ for light in the1.55 μm wavelength band.*

* * * * *